United States Patent [19]
Inoue et al.

[11] Patent Number: 5,729,758
[45] Date of Patent: Mar. 17, 1998

[54] SIMD PROCESSOR OPERATING WITH A PLURALITY OF PARALLEL PROCESSING ELEMENTS IN SYNCHRONIZATION

[75] Inventors: Yoshitsugu Inoue; Hiroyuki Kawai; Robert Streitenberger, all of Hyogo, Japan

[73] Assignee: Mitsubishi Denki Kabushiki Kaisha, Tokyo, Japan

[21] Appl. No.: 465,245

[22] Filed: Jun. 5, 1995

[30] Foreign Application Priority Data

Jul. 15, 1994 [JP] Japan ................... 6-164333

[51] Int. Cl.[6] ............................................. G06F 15/80
[52] U.S. Cl. ........................... 395/800.22; 395/800.11
[58] Field of Search ........................... 395/800, 800.11, 395/800.22, 280

[56] References Cited

U.S. PATENT DOCUMENTS

| | | | |
|---|---|---|---|
| 4,314,349 | 2/1982 | Batcher | 364/716 |
| 4,439,839 | 3/1984 | Kneib | 395/800 |
| 4,481,580 | 11/1984 | Martin | 395/800 |
| 5,056,000 | 10/1991 | Chang | 395/800 |
| 5,187,795 | 2/1993 | Balmforth | 395/800 |
| 5,418,952 | 5/1995 | Morley | 395/650 |
| 5,471,592 | 11/1995 | Gove | 395/300.03 |
| 5,481,736 | 1/1996 | Schwartz | 395/800 |
| 5,497,465 | 3/1996 | Chin | 395/280 |
| 5,581,777 | 12/1996 | Kim | 395/800 |
| 5,606,707 | 2/1997 | Tomassi | 395/800 |

FOREIGN PATENT DOCUMENTS

| | | |
|---|---|---|
| 1-244578 | 9/1989 | Japan . |
| 5-101027A | 4/1993 | Japan . |
| WO 87/04829 | 8/1987 | United Kingdom . |
| WO 88/04075 | 6/1988 | United Kingdom . |
| WO 87/06039 | 10/1987 | WIPO . |

OTHER PUBLICATIONS

"Architecuture of SSI–Image Signal Processor for Image Processing", Fukushima et al., Transactions of the Institute of Electronics, Information and Communication Engineers of Japan, 83/12, vol. J66–C, No. 12.

*Primary Examiner*—Eric Coleman
*Attorney, Agent, or Firm*—Lowe, Price, LeBlanc & Becker

[57] ABSTRACT

Three local buses and three composite operation buses are provided in each processing element. An arithmetic logic unit, a multiplier, a bit operator, and an accumulator are connected to respective local buses and the composite operation buses. As a result, each operation unit can transfer data efficiently using a plurality of buses of different functions.

2 Claims, 22 Drawing Sheets

FIG.6

| SG | SELECTOR S22 | SELECTORS21 | | | | PE(OUTPUT/INPUT) | | | | | | | |
|---|---|---|---|---|---|---|---|---|---|---|---|---|---|
| | | IOc0 | IOc1 | IOc2 | IOc3 | PEc0 | PEc1 | PEc2 | PEc3 | PEc4 | PEc5 | PEc6 | PEc7 |
| 000 | s0 | d0 | d0 | d0 | d0 | GP0/GP0 | GP1/GP1 | GP2/GP2 | GP3/GP3 | GP4/GP4 | GP5/GP5 | GP6/GP6 | GP7/GP7 |
| 001 | s1 | d1 | d0 | d0 | d0 | GP4/GP1 | GP1/GP2 | GP2/GP3 | GP3/GP0 | GP0/GP5 | GP5/GP6 | GP6/GP7 | GP7/GP4 |
| 010 | s2 | d1 | d1 | d0 | d0 | GP4/GP2 | GP5/GP3 | GP2/GP0 | GP3/GP1 | GP0/GP6 | GP1/GP7 | GP6/GP4 | GP7/GP5 |
| 011 | s3 | d1 | d1 | d1 | d0 | GP4/GP3 | GP5/GP0 | GP6/GP1 | GP3/GP2 | GP0/GP7 | GP1/GP4 | GP2/GP5 | GP7/GP6 |
| 100 | s0 | d1 | d1 | d1 | d1 | GP0/GP0 | GP5/GP1 | GP6/GP2 | GP7/GP3 | GP0/GP4 | GP1/GP5 | GP2/GP6 | GP3/GP7 |
| 101 | s1 | d0 | d1 | d1 | d1 | GP0/GP1 | GP5/GP2 | GP6/GP3 | GP7/GP0 | GP4/GP5 | GP1/GP6 | GP2/GP7 | GP3/GP4 |
| 110 | s2 | d0 | d0 | d1 | d1 | GP0/GP2 | GP1/GP3 | GP6/GP0 | GP7/GP1 | GP4/GP6 | GP5/GP7 | GP2/GP4 | GP3/GP5 |
| 111 | s3 | d0 | d0 | d0 | d1 | GP0/GP3 | GP1/GP0 | GP2/GP1 | GP7/GP2 | GP4/GP7 | GP5/GP4 | GP6/GP5 | GP3/GP6 |

FIG.12

| MNEMONIC | opcode | PROCESS CONTENTS | NUMBER OF OPERATION STAGES | f0 | f1 | p1 <1:0> | f2 | p2 <2:0> | f3 | p3 <3:0> |
|---|---|---|---|---|---|---|---|---|---|---|
| add | 000000 | s0+s1 | 1 | add | nop | 10 | nop | 100 | nop | 1000 |
| sub | 000001 | s0-s1 | 1 | sub | nop | 10 | nop | 100 | nop | 1000 |
| subsr | 000010 | (s0-s1)2 | 2 | sub | mpy | 10 | nop | 100 | nop | 1000 |
| subsra | 000011 | Σ(s0-s1)2 | 4 | sub | mpy | 10 | ars | 100 | add | 1000 |
| inc | 000100 | s0+1 | 1 | inc | nop | 10 | nop | 100 | nop | 1000 |
| dec | 000101 | s0-1 | 1 | dec | nop | 10 | nop | 100 | nop | 1000 |
| ab | 000110 | \|s0\| | 1 | ab | nop | 10 | nop | 100 | nop | 1000 |
| subab | 000111 | \|s0-s1\| | 1 | subab | nop | 10 | nop | 100 | nop | 1000 |
| subaba | 001000 | Σ\|s0-s1\| | 1 | subab | nop | 10 | nop | 100 | add | 0010 |
| thru | 001001 | s0→3d0 | 1 | thru | nop | 10 | nop | 100 | nop | 1000 |
| not | 001010 | -s0 | 1 | not | nop | 10 | nop | 100 | nop | 1000 |
| sacc | 001011 | s0→6d0 | 2 | thru | nop | 10 | nop | 100 | thru | 0010 |
| and | 001100 | s0&s1 | 1 | and | nop | 10 | nop | 100 | nop | 1000 |
| or | 001101 | s0\|s1 | 1 | or | nop | 10 | nop | 100 | nop | 1000 |
| andbc | 001110 | NUMBER OF ONES IN s0&s1 | 2 | and | nop | 10 | bc | 010 | nop | 1000 |
| andbca | 001111 | Σ(NUMBER OF ONES IN s0&s1) | 3 | and | nop | 10 | bc | 010 | add | 0100 |
| eor | 010000 | s0^s1 | 1 | eor | nop | 10 | nop | 100 | nop | 1000 |
| enr | 010001 | -(s0^s1) | 1 | enr | nop | 10 | nop | 100 | nop | 1000 |
| enrbc | 010010 | NUMBER OF ONES IN -(s0^s1) | 2 | enr | nop | 10 | bc | 010 | nop | 1000 |
| enrbca | 010011 | Σ(NUMBER OF ONES IN -(s0^s1)) | 3 | enr | nop | 10 | bc | 010 | nop | 0100 |
| max | 010100 | max(s0,s1) | 1 | max | nop | 10 | nop | 100 | nop | 1000 |
| min | 010101 | min(s0,s1) | 1 | min | nop | 10 | nop | 100 | nop | 1000 |
| mpy | 010110 | s0×s1 | 1 | nop | mpy | 01 | nop | 100 | nop | 1000 |
| mpyr | 010111 | (s0×s1)>> (ARITHMETIC SHIFT VALUE) | 2 | nop | mpy | 01 | ars | 010 | nop | 1000 |
| mac | 011000 | Σ((s0×s1)>> (ARITHMETIC SHIFT VALUE)) | 3 | nop | mpy | 01 | ars | 010 | add | 0100 |
| lrs | 011001 | s0>> (LOGIC SHIFT VALUE) | 1 | nop | nop | 10 | lrs | 001 | nop | 1000 |
| lls | 011010 | s0<< (LOGIC SHIFT VALUE) | 1 | nop | nop | 10 | lls | 001 | nop | 1000 |
| lrand | 011011 | (s0&s1)>> (LOGIC SHIFT VALUE) | 1 | nop | nop | 10 | lrand | 001 | nop | 1000 |
| lland | 011100 | (s0&s1)<< (LOGIC SHIFT VALUE) | 1 | nop | nop | 10 | lland | 001 | nop | 1000 |
| lrada | 011101 | Σ((s0&s1)>> (LOGIC SHIFT VALUE)) | 2 | nop | nop | 10 | lrand | 001 | add | 0010 |
| llada | 011110 | Σ((s0&s1)<< (LOGIC SHIFT VALUE)) | 2 | nop | nop | 10 | lland | 001 | add | 0010 |
| lror | 011111 | (s0\|s1)>> (LOGIC SHIFT VALUE) | 1 | nop | nop | 10 | lror | 001 | nop | 1000 |
| llor | 100000 | (s0\|s1)<< (LOGIC SHIFT VALUE) | 1 | nop | nop | 10 | llor | 001 | nop | 1000 |
| bc | 100001 | NUMBER OF ONES IN s0 | 1 | nop | nop | 10 | bc | 001 | nop | 1000 |
| ars | 100010 | s0>> (ARITHMETIC SHIFT VALUE) | 1 | nop | nop | 10 | ars | 001 | nop | 1000 |
| als | 100011 | s0<< (ARITHMETIC SHIFT VALUE) | 1 | nop | nop | 10 | als | 001 | nop | 1000 |
| ara | 100100 | Σ(s0>> (LOGIC SHIFT VALUE)) | 2 | nop | nop | 10 | ars | 001 | add | 0010 |

FIG. 16

| TIME | t0 | t1 | t2 | t3 | t4 | t5 | t6 | t7 | t8 | t9 | t10 | t11 | t12 | t13 | t14 |
|---|---|---|---|---|---|---|---|---|---|---|---|---|---|---|---|
| INSTRUCTION | subsra | subsra | subsra | subsra | set | mac | mac | mac | set | subsra | subsra | subsra | | | |
| enablePE | 1 | 1 | 1 | 1 | 1 | 0 | 0 | 0 | 0 | 1 | 1 | 1 | | | |
| p1 | 10 | 10 | 10 | 10 | 10 | 01 | 01 | 01 | 10 | 10 | 10 | 10 | | | |
| p2 | 100 | 100 | 100 | 100 | 100 | 010 | 010 | 010 | 100 | 100 | 100 | 100 | | | |
| p3 | 1000 | 1000 | 1000 | 1000 | 1000 | 0100 | 0100 | 0100 | 1000 | 1000 | 1000 | 1000 | | | |
| f0 | sub | sub | sub | sub | nop | nop | nop | nop | nop | sub | sub | sub | | | |
| enableALU | 1 | 1 | 1 | 1 | 1 | 0 | 0 | 0 | 0 | 1 | 1 | 1 | | | |
| cALU | sub | sub | sub | sub | nop | nop | nop | nop | nop | sub | sub | sub | | | |
| f1 | | mpy | mpy | mpy | mpy | mpy | mpy | mpy | nop | nop | mpy | mpy | mpy | | |
| enableMPY | | 1 | 1 | 1 | 1 | 1 | 1 | 1 | 0 | 0 | 1 | 1 | 1 | | |
| cMPY | | mpy | mpy | mpy | mpy | nop | nop | nop | nop | nop | mpy | mpy | mpy | | |
| f2 | | | ars | ars | ars | ars | ars | ars | ars | nop | nop | ars | ars | ars | |
| enableBMU | | | 1 | 1 | 1 | 1 | 0 | 0 | 0 | 0 | 0 | 1 | 1 | 1 | |
| cBMU | | | ars | ars | ars | ars | nop | nop | nop | nop | nop | ars | ars | ars | |
| f3 | | | | add | add | add | add | add | add | add | nop | nop | add | add | add |
| enableAU | | | | 1 | 1 | 1 | 1 | 0 | 0 | 0 | 0 | 0 | 1 | 1 | 1 |
| cAU | | | | add | add | add | add | nop | nop | nop | nop | nop | add | add | add |

FIG.18

| TIME | OPERATION | max | min |
|---|---|---|---|
| t0 | max(gP0,LM[0]) →LM[0] | | REG |
| t1 | max(REG,LM[1])→LM[1] | | REG |
| t2 | max(REG,LM[2])→LM[2] | | REG |
| t3 | max(gP1,LM[0]) →LM[0] | | REG |
| t4 | max(REG,LM[1])→LM[1] | | REG |
| t5 | max(REG,LM[2])→LM[2] | | REG |
| ⋮ | ⋮ | | |
| t3n | max(gP1,LM[0]) →LM[0] | | REG |
| t(3n+1) | max(REG,LM[1])→LM[1] | | REG |
| t(3n+2) | max(REG,LM[2])→LM[2] | | REG |

SIMD PROCESSOR OPERATING WITH A PLURALITY OF PARALLEL PROCESSING ELEMENTS IN SYNCHRONIZATION

BACKGROUND OF THE INVENTION

1. Field of the Invention

The present invention relates to an SIMD (Single Instruction stream Multiple Data stream) processor that operates with a plurality of parallel processing elements in synchronization, and that is controlled with a single instruction indicated by a unitary program counter. More particularly, the present invention relates to an SIMD processor suitable for image processing.

2. Description of the Background Art

A conventional image processing SIMD processor will be described hereinafter with reference to a block diagram of FIG. 22 showing a structure thereof.

An SIMD processor includes a control unit 100 for carrying out the overall control in a programmable manner, a memory unit 101 for storing load coefficients and template data, a data unit 102 including shift registers 121a–121c for transferring image data, a processor unit 103 having a plurality of processing elements (PE) 131a–131d arranged in parallel including an arithmetic logic unit (ALU) 132 and a multiplier (MPY) 133, a linkage unit 104 including arithmetic logic units 141 and 142, and an evaluation unit 105 formed of a comparator.

Each of processing elements 131a–131d in processor unit 103 carries out the same process on different data transferred in parallel from data unit 102 or memory unit 101 according to a control signal from control unit 100. The calculation result of each of processing elements 131a–131d is transferred to linkage unit 104, whereby an integration process is carried out between processing elements 131a–131d. For example, in the case of an image filtering process, multiplication of a pixel in each horizontal direction and a load coefficient in a local window is carried out in parallel by each of processing elements 131a–131d. The results are added in linkage unit 104.

An image process includes a variety of processes such as operation between images, measurement of an image area or of the center point, and pattern matching, in addition to the above filtering process. Most of the processes can be carried out by a single operation process with respect to a great amount of data. It is therefore effective to carry out various algorithms by modifying the program using an SIMD processor from the standpoint of saving the hardware.

Although a conventional SIMD processor of the above-described structure can carry out a filtering process, operations specific to image processing such as product-sum operation and bit operation cannot be carried out due to the inadequacy of the processing element function. Furthermore, a conventional SIMD processor required a great amount of processing steps. The operated results of the processing elements can be integrated only through a linkage unit. The integrated result cannot be reflected back to the processing element. There was the problem that a process using the integrated result cannot be effected. Thus, even though a conventional SIMD processor is programmable, it had various problems such as low processing speed and insufficient functions. It was effective only for a partial processing of the image processing field, and its range of application was extremely limited.

SUMMARY OF THE INVENTION

An object of the present invention is to provide an SIMD processor of a wide application range that can carry out various processes.

Another object of the present invention is to provide an SIMD processor that can carry out a process at high speed.

A further object of the present invention is to provide an SIMD processor that can transfer data between processing elements at high speed.

Still another object of the present invention is to provide an SIMD processor that can have circuit complexity reduced.

A still further object of the present invention is to provide an SIMD processor that can have the number of control buses reduced.

Yet a further object of the present invention is to provide an SIMD processor that can have instruction description simplified.

An SIMD processor according to an aspect of the present invention includes an overall control unit, a plurality of processing elements, a global bus for connecting unidimensionally each of the plurality of processing elements in parallel, and a control bus for connecting the control unit with each of the plurality of processing elements. Each of the plurality of processing elements includes a local memory, a plurality of operation units, a data input/output unit, three local buses connected to the local memory, the plurality of operation units, and the data input/output unit for transferring data, and a composite operation bus connected to each operation unit for transferring data to carry out a composite operation. The overall control unit controls the operation of each of the plurality of processing elements to carry out the same operation.

According to the above structure, data can be transmitted to each of the three local buses and to the composite operation bus in the SIMD processor. Therefore, the data transmission efficiency between processing elements is improved, and various operations can be carried out at high speed.

An SIMD processor according to another aspect of the present invention includes an overall control unit, a plurality of processing elements each having a local memory, and a global bus for connecting unidimensionally each of the plurality of processing elements in parallel. The global bus includes a first global bus for transmitting an output data of the overall control unit to each of the plurality of processing elements, a second global bus for providing each output data of the plurality of processing elements to each of the plurality of processing elements, and a third global bus for providing the data of a local memory of one of the plurality of processing elements to another processing element. According to the above structure, the provision of three global buses of different functions in an SIMD processor allows data transfer between processing elements in a flexible and speeded manner.

An SIMD processor according to a further aspect of the present invention includes eight processing elements provided in parallel, and eight global buses connecting the eight processing elements logically at equal intervals. Each of the eight processing elements receives data from four predetermined global buses out of the eight global buses, and provides data to two predetermined global buses out of the remaining four global buses.

According to the above structure, the connection of the eight processing elements logically at equal intervals in an SIMD processor allows data transfer between processing elements at high speed and also with respect to a combination of various processing elements.

An SIMD processor according to still another aspect of the present invention includes a plurality of processing elements. Each of the plurality of processing elements includes a local memory, and an input unit for selectively providing an output data of the local memory of a processing element to the local memory of an adjacent processing element. The local memories are connected in series.

According to the above structure, the connection of the local memories in series in each processing element in a chain-like manner allows the local memory to be functioned as a line memory effective for image processing. Since an internal local memory can be used individually or in a series-connected manner, it can be made to function as a line memory effective for image processing, and also allows external data independent of each local memory to be input. As a result, data transfer can be carried out speedily. High speed processing is allowed by operating each processing element in parallel. The SIMD processor can be utilized in a wide range of applications.

An SIMD processor according to a still further aspect of the present invention includes a plurality of processing element, wherein each of the processing elements has a local memory. The local memory includes three bank memories, each controllable individually.

According to the above structure, two bank memories can carry out a readout operation while one bank memory carries out a writing operation at a same time. Therefore, processing at a high speed is possible.

An SIMD processor according to yet a further aspect of the present invention includes an overall control unit, a plurality of processing elements, a global bus connecting unidimensionally each of the plurality of processing elements in parallel, and a control bus for connecting the overall control unit with each of the plurality of processing elements. Each processing element includes a plurality of operation units each operating in response to a control signal, a decoder for decoding an operation code transmitted from the overall control unit via a control bus to provide a plurality of control signals and a pipeline delay signal corresponding to the plurality of operation units, and a plurality of pipeline registers provided corresponding to each of the plurality of control signals, receiving a corresponding control signal out of the plurality of control signals, and responsive to a pipeline delay signal corresponding to a plurality of pipeline delay signals for providing a control signal at a predetermined timing.

According to the above structure, the control signal output from the overall control unit includes only an operation code. Therefore, the number of control buses can be reduced.

An SIMD processor according to yet another aspect of the present invention includes an overall control unit, a plurality of processing elements, a global bus connecting unidimensionally each of the plurality of processing elements in parallel, and a control bus connecting the overall control unit with each of the plurality of processing elements. Each processing element includes a plurality of operation units each operating in response to a control signal, a comparator for comparing a flag corresponding to an operation result output from each of the plurality of operation units with a condition determination code applied from the overall control unit via a control bus, and a mask unit responsive to the comparison result of the comparator for masking a control signal output corresponding to each of the plurality of operation from the overall control unit units via the control bus, and providing the masked control signal.

According to the above structure, a plurality of processing elements operating in parallel according to the same control signal can be selectively operated according to an operation result. Therefore, processes of greater variety can be carried out.

An SIMD processor according to yet a still further aspect of the present invention includes an overall control unit, a plurality of processing elements having a plurality of operation units each operating in response to a control signal, a global bus connecting unidimensionally the overall control unit with each of the plurality of processing elements in parallel, and a control bus connecting the overall control unit with each of the plurality of processing elements. The overall control unit includes a pipeline unit for delaying a control signal corresponding to each of the plurality of control units via a pipeline. The pipeline unit provides a plurality of pipeline-delay values required for pipe-insertion and a pipeline-delay control signal to each of plurality of processing elements via a control bus. Each processing element further includes a comparator for comparing a flag corresponding to each operation result output from the plurality of operation units with a condition determination code provided from the overall control unit via a control bus, and a mask unit responsive to a plurality of pipeline-delay values and a comparison result of the comparator for masking a control signal output from the pipeline unit to provide the masked control signal to corresponding plurality of operation units.

According to the above structure, instruction description of a control signal is facilitated in an SIMD processor. A code determination instruction can be described at an arbitrary position. Therefore, the number of instruction steps can be reduced to improve the processing rate.

An SIMD processor according to another aspect of the present invention includes a plurality of processing elements, a link processing unit, and a global bus connecting unidimensionally each of the plurality of processing elements and the link processing unit. The link processing unit includes at least an arithmetic logic unit capable of addition and detection of a maximum value/minimum value, and a local memory for storing data.

According to the above structure, accumulation and sorting of the outputs of the processing elements can be carried out without having to transfer data between each of the processing elements. Therefore, the processing operation by each processing element is speeded, and the integration function of data between the processing elements is improved.

An SIMD processor according to a further aspect of the present invention includes eight processing elements, a link processing unit, and a global bus connecting unidimensionally each of four processing elements and the link processing unit. The link processing unit includes eight divide units dividing each output data of the eight processing units into upper data and lower data and selecting and providing either the upper level data or the lower level data. The link processing unit combines the eight output data from the eight divide units for providing four output data.

According to the above structure, the outputs of the processing elements can be provided outside the SIMD processor in various modes. Data can be output with a reduced number of external output lines with respect to eight parallel outputs.

An SIMD processor according to a further aspect of the present invention includes a plurality of processing elements, a link processing unit, a global bus connecting unidimensionally each of the plurality of processing elements and the link processing unit. The link processing unit includes a sorting unit for sorting a plurality of data applied from the plurality of processing elements to the global bus, and a code allocation unit for allocating a predetermined code to each of the plurality of data sorted by the sorting unit.

According to the above structure, it is not necessary to generate a code by the processing element. Therefore, the circuit complexity can be reduced. Furthermore, the process is speeded since code allocation and sorting are carried out parallel to the operation of the processing elements.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 shows the relationship between a global bus input/output control signal and input/output selection of the data input/output unit.

FIG. 12 shows the relationship between instruction and control of the SIMD processor of FIG. 11.

FIG. 16 is a diagram for describing an operation of the pipeline register of FIG. 15.

FIG. 18 is a diagram for describing a sorting process.

DESCRIPTION OF THE PREFERRED EMBODIMENTS

First Embodiment

Figure 1:
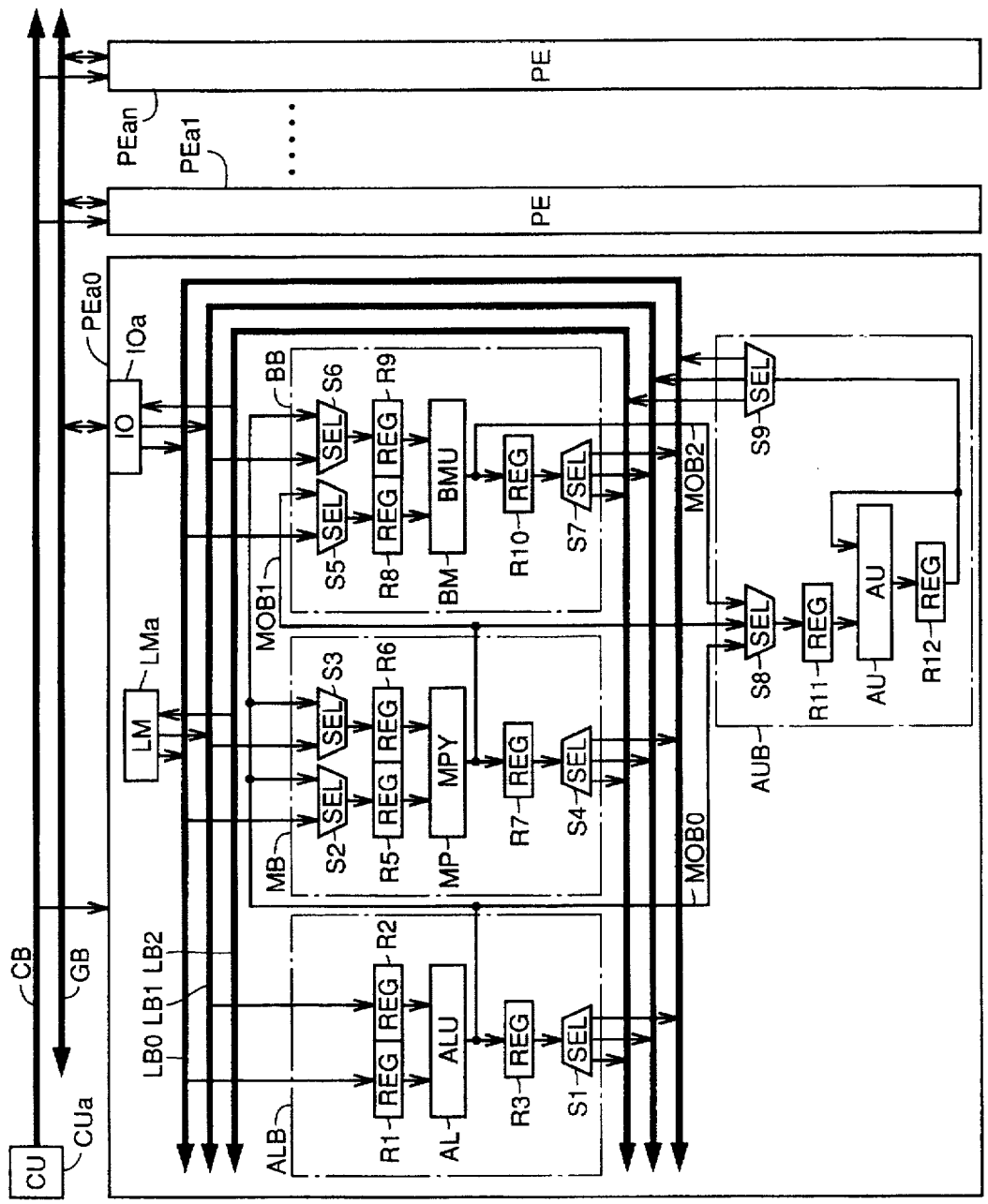
FIG. 1 is a block diagram showing a structure of an SIMD processor according to a first embodiment of the present invention.

Referring to FIG. 1, an SIMD processor includes an overall control unit (CU) CUa for controlling each processing element, a plurality of processing elements (PE) PEa0–PEan, a global bus GB for connecting unidimensionally each of processing elements PEa0–PEan in parallel, and a control bus CB for connecting overall control unit CUa and each of processing elements PEa–PEn.

Each of processing elements PEa0–PEan includes a local memory (LM) LMa, a data input/output unit (IO) IOa, an ALU block ALB, an MPY block MB, a BMU block BB, an AU block AUB, local buses LB0–LB2, and composite operation buses MOB0–MOB2.

ALU block ALB includes registers R1 (REG) R1–R3, a selector (SEL) S1, and an arithmetic logic unit (ALU) AL. MPY block MB includes selectors S2–S4, registers R5–R7, and a multiplier (MPY) MP. BMU block BB includes selectors S5–S7, registers R8–R10, and a bit operator (BMU) BM. AU block AUB includes selectors S8 and S9, registers R11 and S12, and an accumulator (AU) AU.

Processing elements PEa0–PEan are controlled by a control signal output from overall control unit CU via control bus CB. Each processing element carries out the same process, and data transfer between the processing elements is carried out through global bus GB.

ALU block ALB, MPY block MB, BMU block BB, and AU block AUB in a processing element are connected by local buses LB0–LB2.

A local memory LMa is controlled by a control signal provided via control bus CB to store data read out from local bus LB2. The data read out from local memory LMa is provided to local buses LB0 and LB1.

Data input/output unit IOa controls data input/output when data in each of processing elements PEa0–PEan is to be transferred to and from another processing element.

Arithmetic logic unit AL carries out an arithmetic operation such as addition, subtraction, and absolute value, or a logical operation such as inclusive OR, AND, and exclusive OR on two inputs with the data transferred from local buses LB0 and LB1 via registers R1 and R2 as the source according to a control signal provided from overall control unit CUa. The result of arithmetic logic unit AL is provided to register R3, MPY block MB, BMU block BB, and AU block AUB via composite operation bus MOB0.

Selector S2 receives data of local bus LB0 and data of composite operation bus MOB0 and provides either data to register R5. Similarly, selector S3 selectively provides data of local bus LB1 and composite operation bus MOB0 to register R6. Multiplier MP receives data of registers R5 and R6. More specifically, multiplier MP receives either output of local bus LB0 or arithmetic logic unit AU at its first input and an output of either local bus LB1 or arithmetic logic unit AU at its second input to carry out multiplication therebetween. The result of multiplier MP is provided to register 7 or MPY block MB and AU block AUB via composite operation bus MOP1.

Selector S5 receives data of local bus LB0 and composite operation bus MOB1 and selectively provides either data to register R8. Similarly, selector S6 provides data of either local data bus LB1 or composite operation bus MOB1 to register R9. Bit operator BM receives data of registers R8 and R9. More specifically, bit operator BM receives either output of local data bus LB0 or multiplier MP at its first input, and an output of either local bus LB1 or arithmetic logic unit AL at its second input, and carries out an operation mainly classified into two types as set forth in the following on the two input data.

Figure 2:
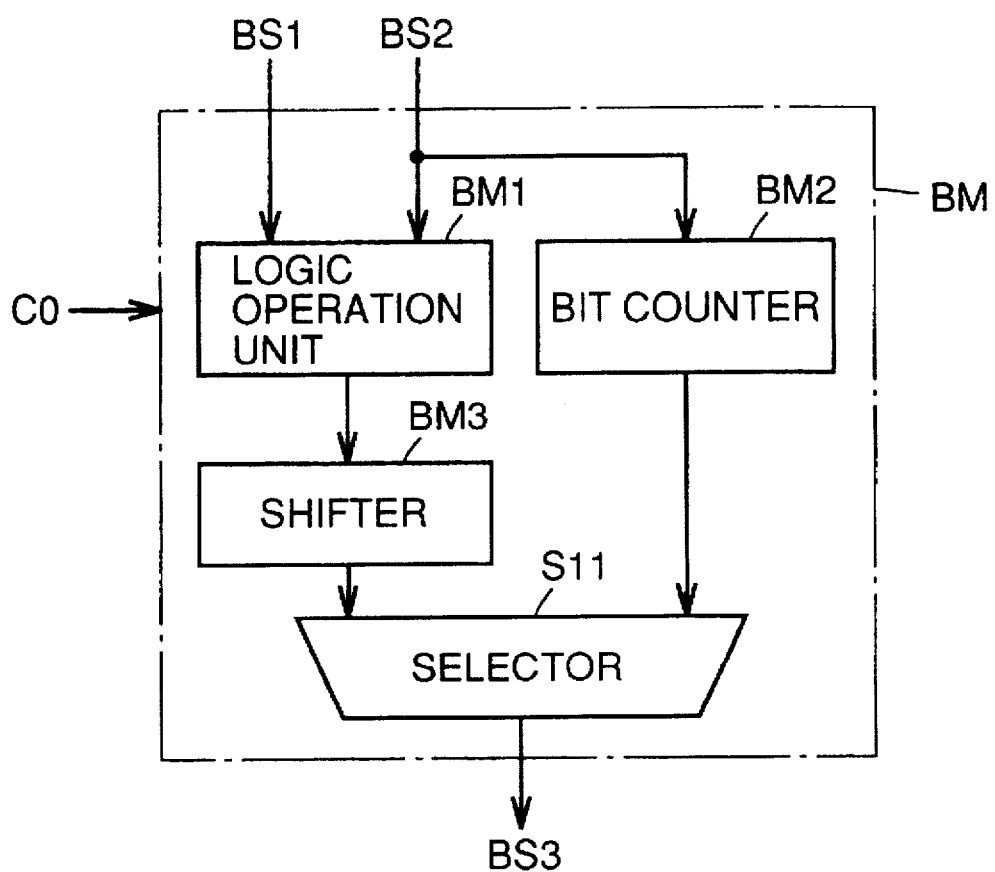
FIG. 2 is a block diagram showing a structure of a bit operator shown in FIG. 1.

FIG. 2 is a block diagram showing a structure of the bit operator of FIG. 1. Referring to FIG. 2, bit operator BM includes a logic unit BM1, a bit counter BM2, a shifter BM3, and a selector S11.

The first operation of bit operator BM is a shifting operation carried out by logic unit BM1 and shifter BM3. More specifically, logic shifting and arithmetic shifting are carried out on the inclusive ORed or ANDed result of first input BS1 provided from register R8 and second input BS2 provided from register R9, or on one of the two inputs BS1 and BS2.

The second operation is to count the number of "1"s in second input BS2 of bit counter BM2. One of the first and second operation results is selected by selector S11 to be provided as output BS3. Output BS3 is provided to register R10 and to AU block AUB via composite operation bus MOB2.

Referring to FIG. 1 again, selector S8 receives each data of arithmetic logic unit AL, multiplier MP, and bit operator BM via composite operation buses MOB0–MOB1. One of the three input data is provided to register R11. Accumulator AU is applied with data of register R11 and its own output via register R12. Accumulator AU sets the data selected by selector S8 or the accumulated data of the selected data and the data of register R12 to register R11.

Each data of the output side registers R3, R7, R10, and R12 of each operation unit is selectively provided to local buses LB0–LB2 via selectors S1, S4, S7 and S9, respectively.

In a general operation, one result is obtained on the basis of two data inputs. In the present embodiment, local buses LB0 and LB1 are used as two input data buses. The operation result is written into local memory LMa. Local bus LB2 is used as an output data bus for data exchange between each processing element. By providing three local buses LB0–LB3 within a processing element, required data transfer can be carried out individually at the same time with respect to one operation instruction. Therefore, high speed processing is allowed.

In a composite operation such as a sum of squared difference where processing must be carried out sequentially through a plurality of operation units, data transfer is carried out via composite operation buses MOB0–MOB2 directly connecting each of the operation units. Data is not transferred via the output side registers R3, R7, R10 of each operation unit and local buses LB0–LB2. In the processing elements of the present embodiment, the same sum of squared difference operation can be carried out for every machine cycle. More specifically, in the case of a sum of squared difference operation, two data read out simultaneously from local memory LMa are applied to arithmetic logic unit AL via local buses LB0 and LB1, whereby subtraction of the inputs is carried out. The subtracted result is provided via composite operation bus MOB0 as the two inputs of multiplier MP. Multiplier MP carries out a square operation according to the two inputs. The square operation result is provided via composite operation bus MOB1 as an input of bit operator BM. The input data directly passes through logic unit BM1, and an arithmetic shifting is carried out by shifter BM3 for arranging the digit positions. The shifted result is transmitted as an input of accumulator AU via composite operation bus MOB2. Accumulator AU carries out an addition calculation of the data of register R12 and the input. By the above-described processes, arithmetic logic unit AL always carries out subtraction, multiplier MP always carries out multiplication, bit operator BM always carries out arithmetic shifting and accumulator AU always carries out accumulation. Therefore, execution of a sum of squared difference operation is repeated continuously without having to insert a data transfer instruction therebetween.

Other composite operations include a sum of the absolute, or accumulation of the number of "1"s in data after a masking operation on a local memory data that is frequently carried out on binary images. These composite operations can also be carried at high speed as described above. As to operation units that are not used in the composite operation process during a composite operation execution or as to operation units that have its operation already finished in a composite operation process, a process belonging to a different operation instruction can be carried out simultaneous to the composite operation instruction without having to wait for completion of a composite operation process.

The output of each operation unit is stored in the output side registers R3, R7, R10 and R12, and then transferred to local memory LMa or to data input/output unit IOa via local bus LB2. It is therefore possible to use registers R3, R7, R10 and R12 as primary registers. Thus, data of each of registers R3, R7, R10 and R12 or data written at the same time local memory LMa is written can become the source of the next instruction without passing through local memory LMa.

In the SIMD processor of the first embodiment including a plurality of processing elements arranged in parallel, there are provided functional blocks such as a local memory, a data input/output unit, an arithmetic logic unit, a multiplier, a bit operator, and an accumulator, and three local buses of two inputs and one output. The output of each operator is applied to a register of the output side or to a selector of the input side of another operation unit. An output of an output side register can be selectively provided to a local bus. Therefore, the data transmission efficiency within a processing element is high. Various operations can be carried out at high speed.

Second Embodiment

Figure 3:
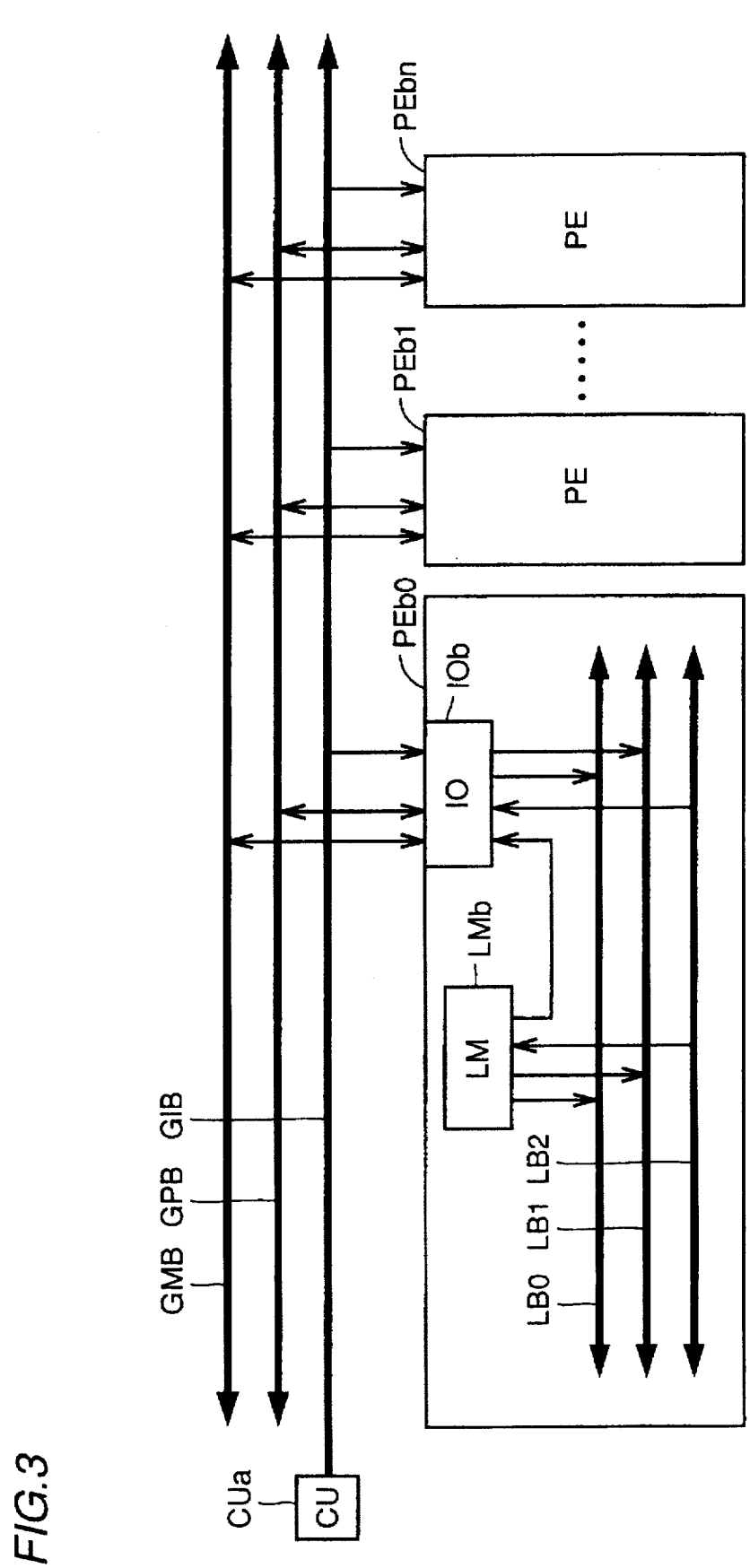
FIGS. 3 and 4 are block diagram showing a structure of the main components of an SIMD processor according to second and third embodiments, respectively, of the present invention.

Referring to FIG. 3, an SIMD processor includes an overall control unit CUa, and a plurality of processing elements PEb0–PEbn. Each of processing elements PEb0–PEbn includes a data input/output unit IOb, a local memory LMb, and local buses LB0–LB2. Similar to processing elements PEa0–PEan of FIG. 1, processing elements of PEb0–PEbn of FIG. 3 includes an ALU block ALB, an MPY block MB, a BMU block BB, and an AU block AUB which are not illustrated for the sake of simplification. The operations of these blocks are similar to those of processing elements PEa0–PEan shown in FIG. 1, and their detailed description will not be repeated.

The characteristic features of the second embodiment will be described hereinafter. Data read out from local memory LMb is provided to local buses LB0 and LB1 as well as to data input/output unit IOb. Data input/output unit IOb is connected to the outside world via a global bus GIB for transmitting data provided from overall control unit CUa, a global bus GPB for exchanging data between processing elements PEb0–PEbn, and a global bus GMB for providing data applied to data input/output unit IOb from local memory LMb.

Immediate data included in an instruction applied to overall control unit CUa or register data in overall control unit CUa is transferred via global bus GIB. Data transfer is carried out via global bus GIB when operation is carried out on a known common data with an operation instruction or when a common data is to be set in local memory LMb and in an output register of an operation unit (not shown).

The number of global buses GPB corresponds to the number of processing elements PEb0–PEbn. Data transfer can be carried out simultaneously between processing elements PEb0–PEbn. Data transfer is carried out via global bus GPB when the total sum of the operation results of parallel-connected processing elements PEb0–PEbn is to be obtained, or when data is to be transferred between processing elements PEb0–PEbn disposed at constant intervals.

Global bus GMB is used when data of local memory LMb in an arbitrary one of the parallel-connected processing elements PEb0–PEbn is to be transferred to all the other processing elements.

In the present second embodiment, three types of global buses are provided for data transfer, including a bus GIB for distributing data from overall control unit CUa to all processing elements PEb0–PEbn, a bus GPB connected to output local bus LB2 in all processing elements PEb0–PEbn via data input/output unit IOb, and a bus GMB for providing data read out from local memory LMb of one of processing elements PEb0–PEbn to all the other processing elements. Thus, data exchange between each processing element can be carried out flexibly and speedily. Since data transfer is allowed via a plurality of global buses, various operations can be carried out at a higher speed. Thus, various processings can be executed.

Third Embodiment

Figure 4:
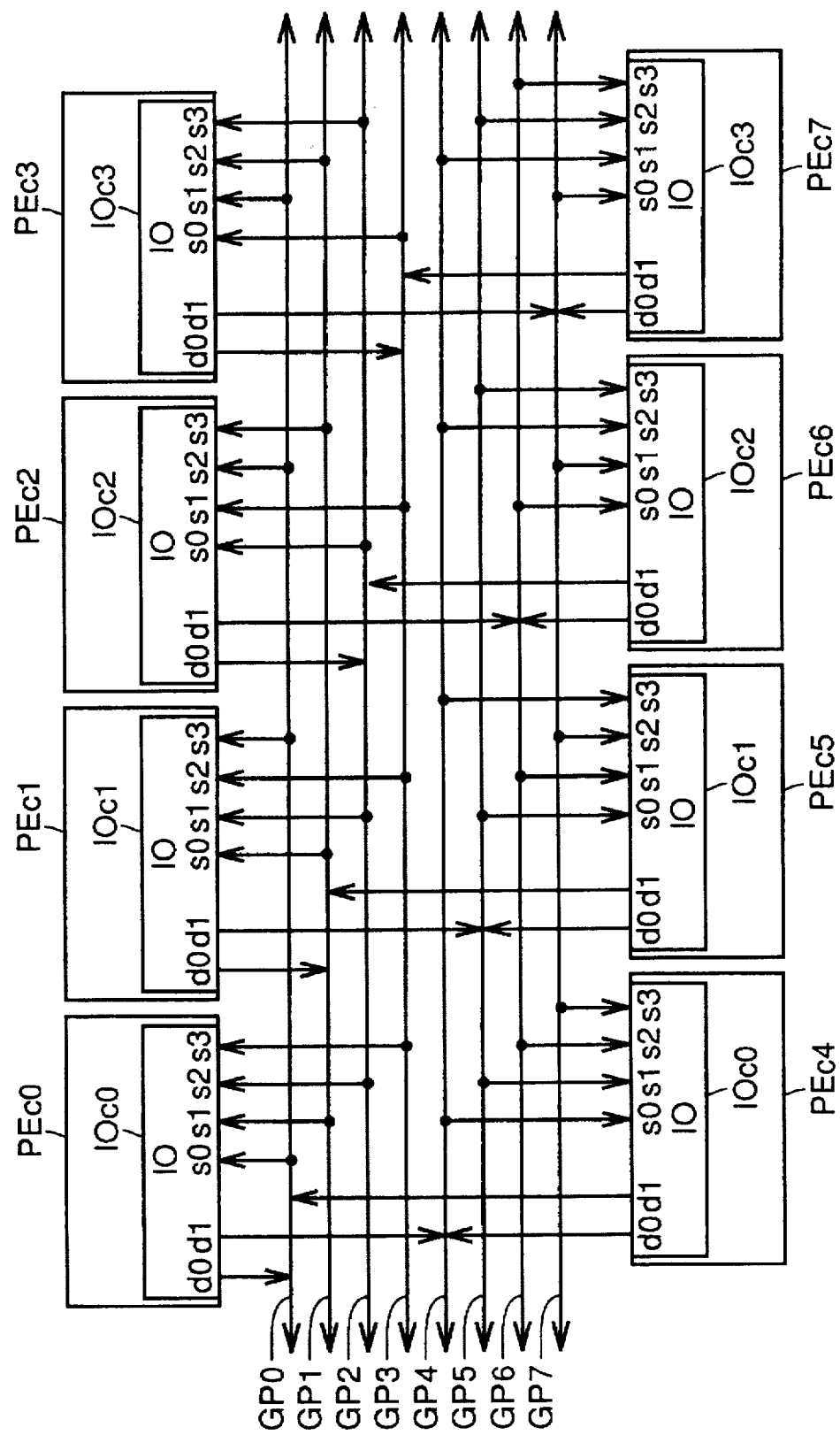

Referring to FIG. 4, an SIMD processor includes eight processing elements PEc0–PEc7, and eight global buses GP0–GP7. Each of processing elements PEc0–PEc7 includes data input/output units IOc0–IOc3. Although an overall control unit, a control bus, a local memory, an MPY block, a BMU block and an AU block are not illustrated in FIG. 4 for the sake of simplification, the operation of each unit is similar to that shown in FIG. 1. Therefore, their description will not be repeated.

Data input/output units IOc0, IOc1, IOc2, and IOc3 are provided as the interface of respective global buses GP0–GP7 in processing elements PEc0 and PEc4, PEc1 and PEc5, PEc2 and PEc6, and PEc3 and PEc7, respectively.

Each of data input/output units IOc0–IOc3 includes two output ports d0 and d1 as the data output portion, and four input ports s0–s3 as the input portion of a processing element. Each port is connected to a predetermined one of global buses GP0–GP7. More specifically, the outputs from data input/output unit IOc0 of processing elements PEc0 and PEc4 are connected to global buses GP0 and GP4. The outputs from data input/output unit IOc1 of processing elements PEc1 and PEc5 are connected to global buses GP1 and GP5. The outputs from data input/output unit IOc2 of processing elements PEc2 and PEc6 are connected to global buses GP2 and GP6. The outputs from data input/output unit IOc3 of processing elements PEc3 and PEc7 are connected to global buses GP3 and GP7. Output ports d0 and d1 are connected to different global buses. Data from global buses GP0–GP3 are applied to the four inputs of processing elements PEc0–PEc3. Data from global buses GP4–GP7 are applied to the inputs of processing elements PEc4–PEc7. Each of input ports S0–S4 is connected to a corresponding global buses shifted by one in order.

The data input/output unit of FIG. 4 will be described in detail with reference to FIG. 5.

Figure 5:
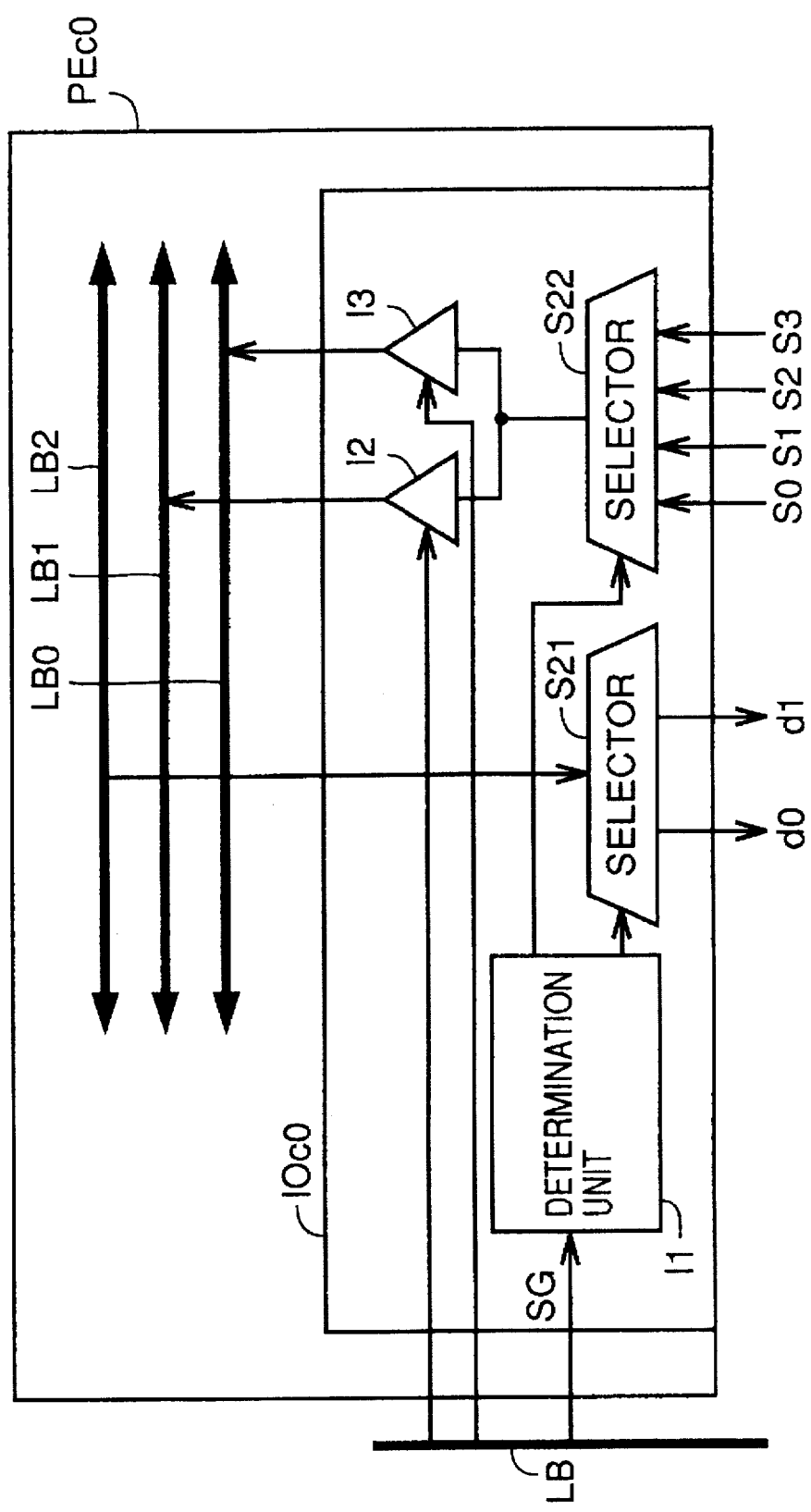
FIG. 5 shows a structure of the data input/output unit of FIG. 4.

Referring to FIG. 5, data input/output unit IOc0 includes determination unit I1, selectors S21 and S22, and bus drivers I2 and I3.

The data on local bus LB2 is selectively provided to either output d0 or d1 by selector S21. One data out of inputs S0–S3 is selected by selector S22. The selected data is applied to bus drivers I2 and I3, and provided to local bus LB0 or LB1 according to a control signal applied via control bus CB. The operations of selectors S21 and S22 are controlled by a control signal output from a determination unit I1 on the basis of a control signal SG applied via control bus CB.

The structure of each of data input/output units IOc0–IOc3 is substantially similar, provided that the function of determination unit I1 determining the selection of data input/output between global buses GB0–GB7 differs. A 3-bit global bus input/output control signal SG is applied to determination unit I1 from local bus CB. Global bus input/output control signal SG is applied in common to all processing elements. The specification of an input/output select signal between the global buses differs for every data input/output unit.

The relationship between global bus input/output control signal SG and selection of input/output of a data input/output unit will be described hereinafter with reference to FIG. 6.

Global bus input/output control signal SG represents the distance between processing elements that exchange data. For example, SG="011" implies that a processing element receives data from the third rightward processing element. That is to say, processing element PEc0 receives data from processing element PEc3, and processing element PEc1 receives data from processing element PEc4.

Data input/output unit IOc0 provides data from output port d1 when control signal SG is 001–100, and otherwise from output port d0. Data input/output unit IOc1 provides data from output port d1 when global bus input/output control signal SG is 010–101, and otherwise from output port D0. Data input/output unit IOc2 provides data from output port d1 when global input/output control signal SG is 001–110, and otherwise from output port d0. Data input/output unit IOc3 provides data from output port d1 when global bus input/output control signal SG is 100–111, and otherwise from output port d0. Since the connection order of a global bus and a data input/output bus is shifted for every data input/output unit, the selection of an input is common for all data input/output units. More specifically, input ports s0, s1 and s2 are respectively selected when the less significant 2 bits of global bus input/output control signal SG is 00, 01, and 11, respectively.

In the SIMD processor of the third embodiment including 8 parallel processing elements, a 4-input and 2-output connection is provided with the global buses. The connection of a global bus with the input/output selection is differed in each processing element. Therefore, data transfer between processing elements logically at equal intervals can be carried out depending upon a combination the global bus connection and the input/output selection. Therefore, the number of lines of connection between each processing element and the global buses is reduced. Furthermore, the circuit complexity of each processing element is reduced. Since each processing element can carry out data transfer logically at equal intervals, the data transfer between processing elements is speeded, and can be carried out with respect to various combinations of processing elements.

Fourth Embodiment

Figure 7:
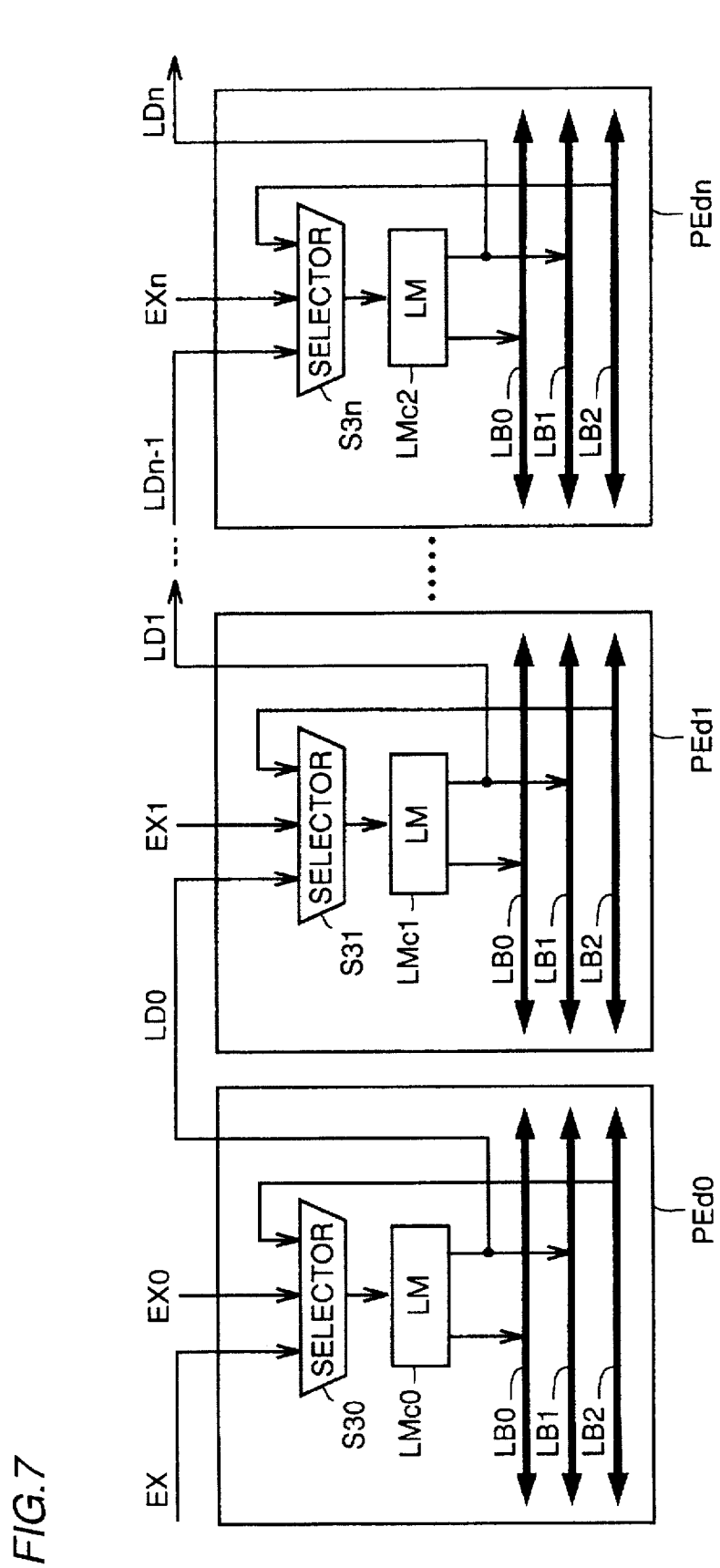
FIG. 7 is a block diagram showing a structure of the main components of an SIMD processor according to a fourth embodiment of the present invention.

Referring to FIG. 7, an SIMD processor includes a plurality of processing elements PEd0–PEdn. Processing element PEd0 includes a selector S30, a local memory LMc0, and local buses LB0–LB2. Each of the other processing elements PEd1–PEdn includes similar components. For the sake of simplification, an overall control unit, a control bus, a global bus, a data input/output unit, an ALU block, an MPU block a BMU block and an AU block are not illustrated in FIG. 4. They have a structure and operation similar to those shown in FIG. 1, and their description will not be repeated.

Selector S32 receives external inputs EX and EX0, and the data of local bus LB2. Selector S30 selects an input data and provides the same to local memory LMc0. Local memory LMc0 stores the input data, and provides the stored data to local buses LB0 and LB1, and to selector S31. Similarly, the data of a local memory is sequentially output to a local memory of a subsequent stage. More specifically, data read out from a local memory is provided to local buses LB0 and LB1 from which one is provided to the local memory of a right-positioned processing element. The data to be written includes data LD0–LDn–1 output from the local memory of a left processing element, external inputs EX0–EXn, and local bus LB2. Selectors S30–S3n selects one of these three data. An input to the leftmost processing element from an adjacent processing element is an external input EX. Each of external inputs EX0–EXn connected to each processing element are individual external inputs inherent to a processing element.

Figure 8:
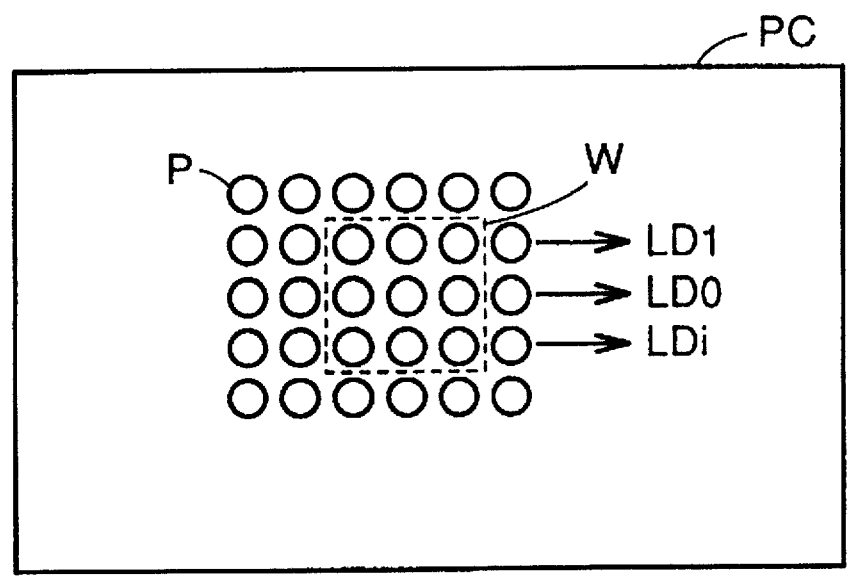
FIG. 8 is a diagram for describing local processing of filtering.

Local processing in filtering will be described hereinafter with reference to FIG. 8. A 3×3 local filtering process is applied as set forth in the following. Processing element PEd0 always carries out processing on the bottom line of a local window W. Processing element PEd1 carries out processing on the last but second horizontal line in local window W. Processing element PEd2 carries out processing on the last but third horizontal line in local window W. The three processing elements always apply processing on pixels of identical position in the horizontal direction. Image data LDi obtained by raster-scanning an image P is sequentially input as external input EX of processing element PEd0 to be written into local memory LMc0. When data transfer of one line in the horizontal direction of image P is completed, data transfer of the next line is initiated together with the start of a process on an already written line.

Image data of the same horizontal position of every differing line is read out from each local memory of all the processing elements. The readout image data becomes the data to be written into the local memory of an adjacent processing element to be stored in a same address. By carrying out the above-described operation, image data of one horizontal line in each local memory is completely transferred to an adjacent local memory when the processing of one line is finished.

When image P is divided into a plurality of regions and a processing element carries out processing on each divided region, image data is selected and provided to a local memory via an each individual external input.

In the local memory of the SIMD processor of the fourth embodiment, the data read out from an adjacent local memory can be selected as data to be written into a current local memory. Therefore, local memories can be connected in series in a chain-like manner. The local memory may serve as a line memory effective for image processing. Since each local memory allows writing of an individual external input, high speed data transfer is realized, and parallel operation is possible. Therefore, high speed processing is allowed, and can be used for a wide range of applications since the above-described processes can be carried out selectively.

Fifth Embodiment

Figure 9:
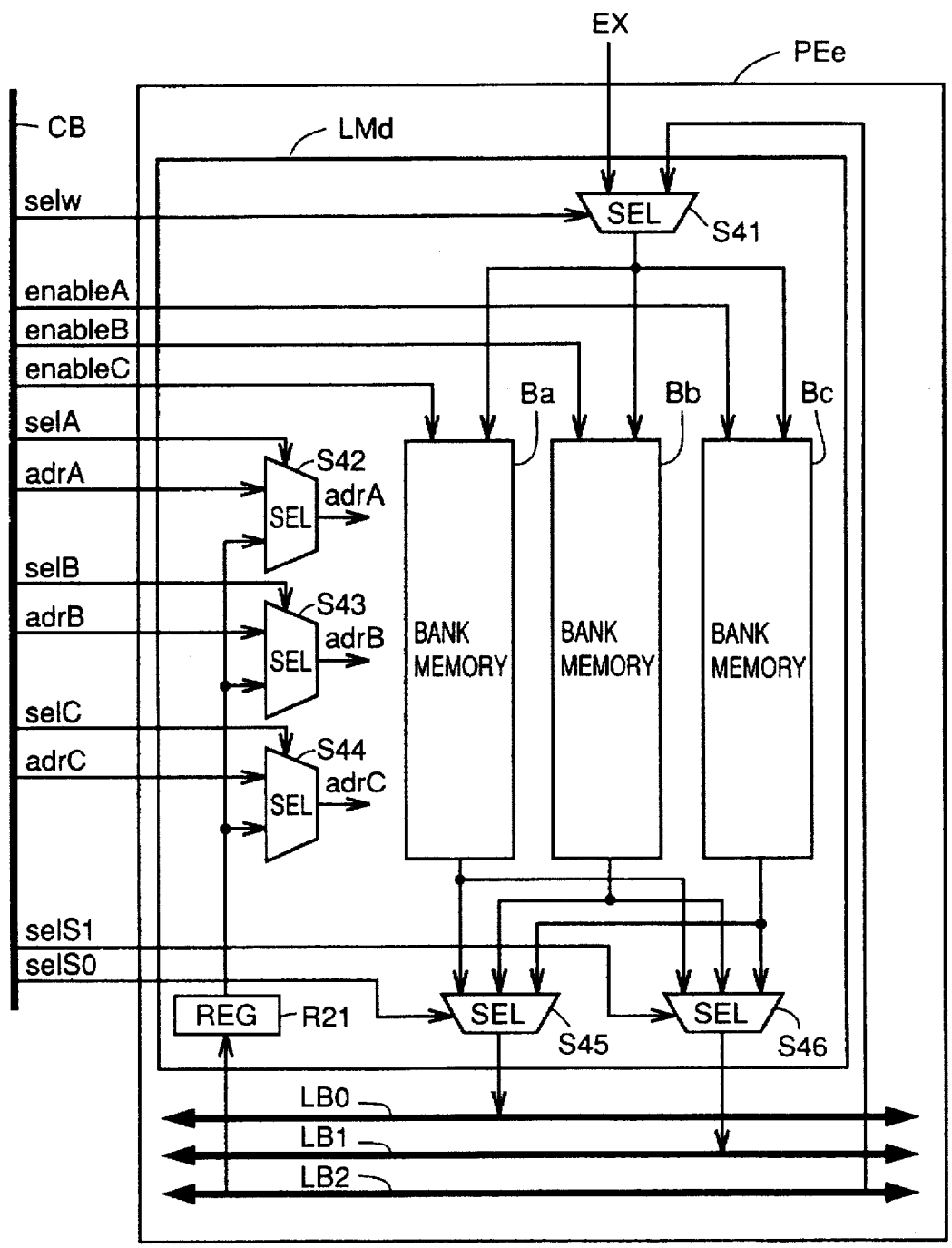
FIGS. 9 and 10 are block diagrams showing a structure of the main components of an SIMD processor according to fifth and sixth embodiments, respectively, of the present invention.

Referring to FIG. 9, an SIMD processor includes a processing element PEe and a control bus CB. Processing element PEe includes a local memory LMd and local buses LB0–LB2. Local memory LMd includes selectors S41–S46, a register R21, and bank memories Ba–Bc. For the sake of simplification, an overall control unit, a global bus, an ALU block, an MPY block, a BMU block, an AU block and a data input/output unit are not illustrated in FIG. 9. The structure and operation thereof are similar to those shown in FIG. 1, so that their description will not be repeated. The number of processing elements is arbitrary, although only one processing element PEe is shown in the present embodiment.

Local memory LMd has a 3-bank structure in which three bank memories Ba–Bc of the same capacity are arranged in parallel. Each of bank memories Ba–Bc receives read and write enable signals enableA–enableC via control bus CB and addresses adrA–adrC. Two bank memories can be used for reading, and one bank memory can be used for writing at the same time. The output of each of bank memories Ba–Bc is connected to local buses LB0 and LB1 via selectors S45 and S46, respectively. An output of any of the bank memories is provided to local buses LB0 and LB1 according to address select signals selS0 and selS1 of control bus CB. As a write data, the data on local bus LB2 or the data applied from outside processing element PEe is selected by selectors S41 in response to control signal selW.

The data on local bus LB2 which is then stored in register R21 or addresses adrA–adrC provided from the overall control unit (not shown) via control bus CB can be selected by selectors S42–S44 as an address. In carrying out a table look up process using an operation result, the bank memory storing the look up table is already known. Therefore, by providing an readout enable signal to that bank memory and by providing an address select signal to select the operation result stored in register R21 as an address, data is read out from the same bank memory in all the processing elements. Since the operation result stored in register R21 can be selected as an address, a process can be carried out in which the readout address differs in each processing element. The operation result can be selected, not only as a readout address, but also as a write address. Therefore, a read modify operation can be carried out where the result of an operation carried out on data of an address obtained by the operation result is written again into the same address.

In the local memory of the SIMD processor of the fifth embodiment, three individually controllable bank memories are provided. Two of the three bank memories can be used for a readout operation, and the remaining one bank memory can be used for a writing operation simultaneously. Therefore, high speed processing is allowed. Since a register R21 storing the operation result is provided, the operation result stored in register R21 can be selected as an address, whereby individual addressing is allowed in the processing elements operating in parallel under the same control signal. Therefore, processing of a high level can be realized.

Sixth Embodiment

Figure 10:
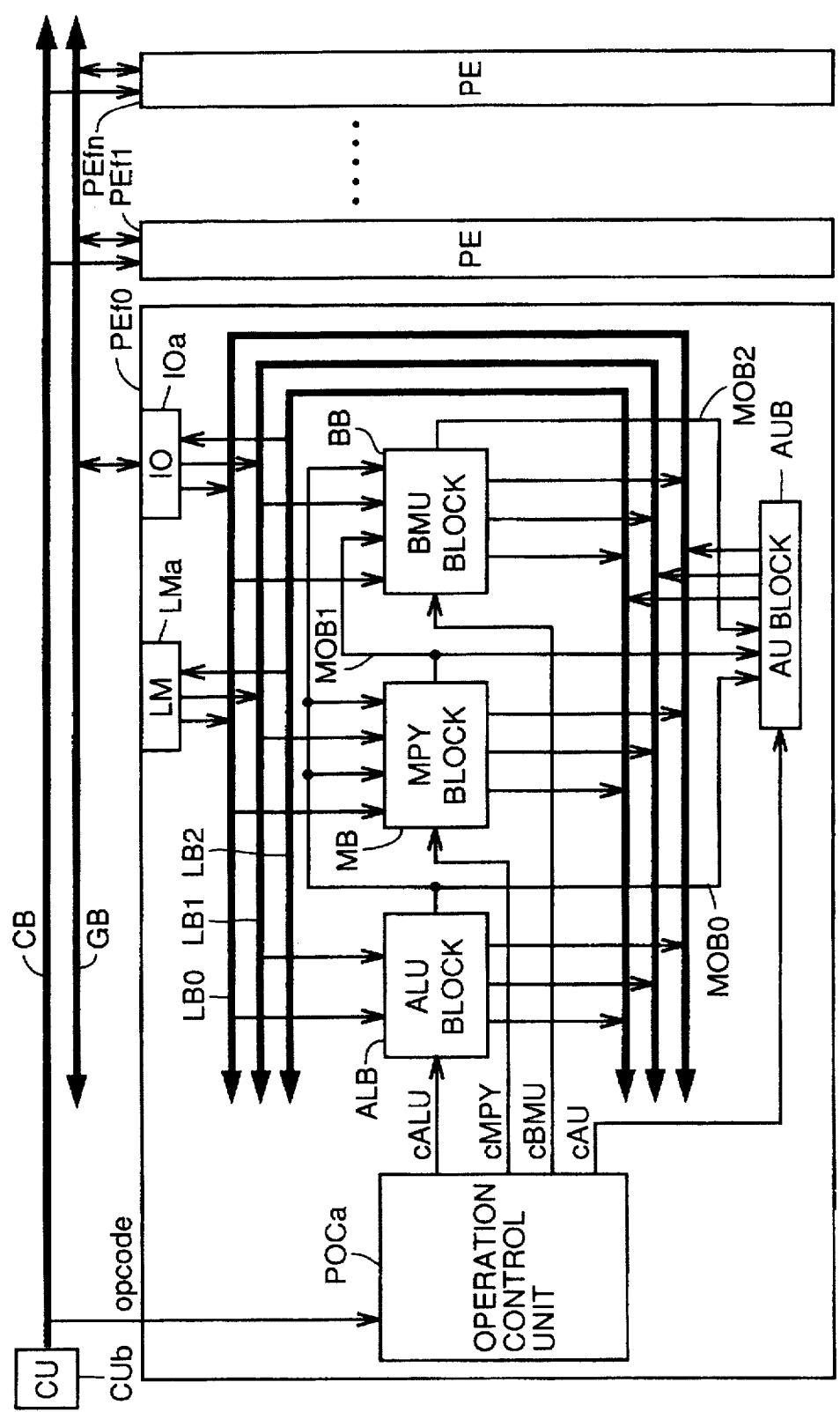

FIG. 10 is a block diagram showing the structure of an SIMD processor of the sixth embodiment. The SIMD processor of FIG. 10 differs from the SIMD processor of FIG. 1 in that a PE operation control unit POCa is additionally provided, and control signals cALU, cMPY, cBMU, and cAU are provided from respective operation unit blocks. The remaining elements are similar to those of FIG. 1, and corresponding components have the same reference characters denoted.

An overall control unit CUb stores an instruction train that is a mnemonic code converted into a binary code, and provides a control signal via control bus CB so that processing elements PEf0–PEfn are sequentially executed. PE operation control unit POCa receives a 6-bit operation code opcode in an instruction via control bus CB.

The PE operation control unit of FIG. 10 will be described in detail with reference to FIG. 11.

Figure 11:
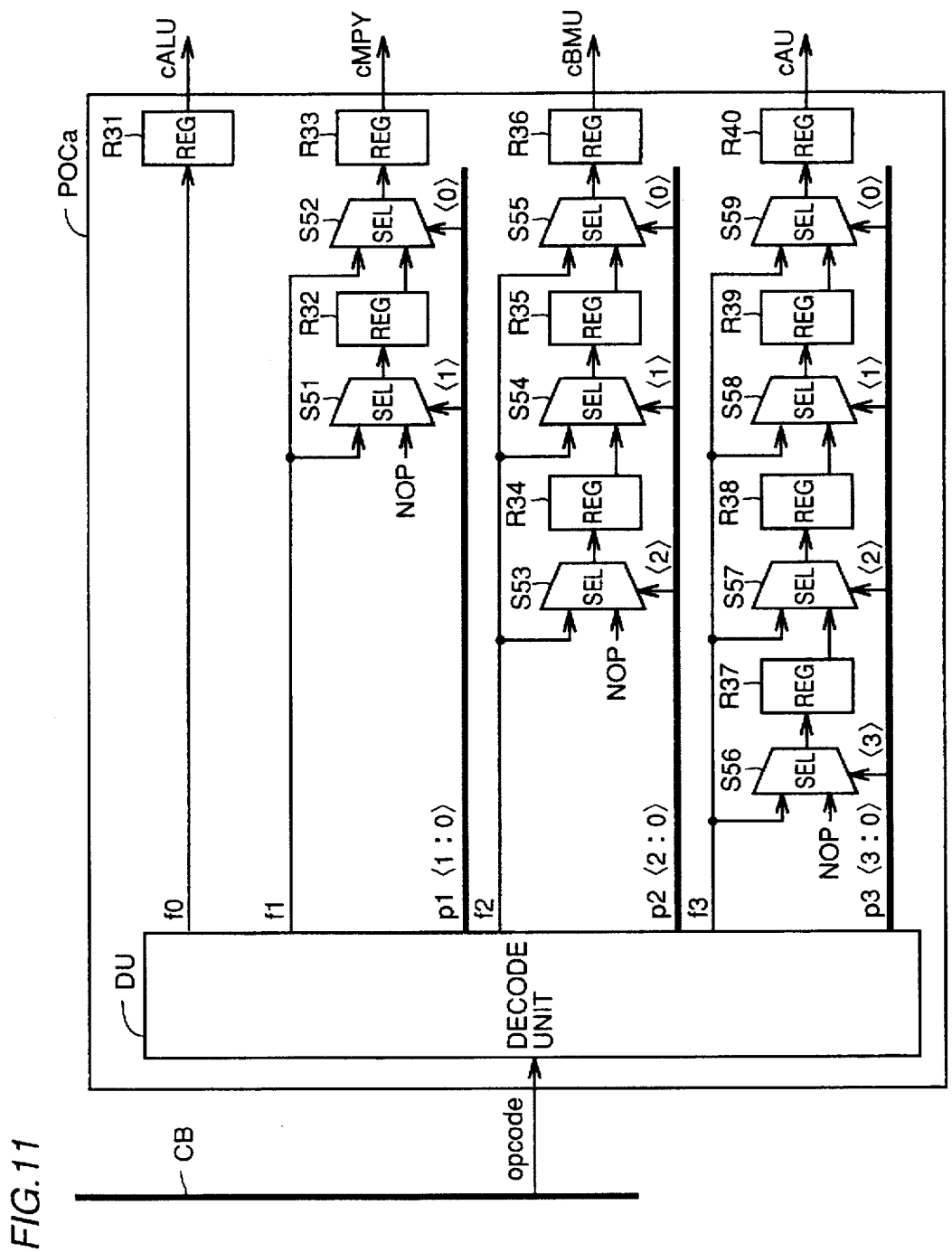
FIG. 11 is a block diagram showing a structure of a PE operation control unit of FIG. 10.

Referring to FIG. 11, a PE operation control unit POCa includes a decode unit DU for decoding an operation code opcode, selectors S51–S59 for transferring control signals cALU, cMPY, cBMU, and cAU for respective operation units, and registers R31–R40.

The number of stages of shift registers differ for each operation unit. The number of registers for an arithmetic logic unit, a multiplier, a bit operator, and an accumulator is one stage, two stages, three stages, and four stages, respectively. Selectors S51–S59 inserted between the registers select either an input from a register of a preceding stage or a control signal from decode unit DU by pipeline delay signals p1–p3 from decode unit DU and provides the same to a register of a succeeding stage.

The operation of the above PE operation control unit will be described in detail. FIG. 12 shows the relationship between an instruction and control in the SIMD processor of FIG. 11. For example, when a sum of squared difference indicated by a mnemonic code of subsra shown in FIG. 12 is to be carried out, a pipeline process is required in which an operation result is sequentially sent to all the operation units over the four stages to obtain the final result. Here, an operation code opcode=000011 is applied to decode unit DU from overall control unit CUb. Decoder unit DU issues a sub instruction to the arithmetic logic unit for obtaining a difference. In order to carry out multiplication at a stage subsequent to the process of the sub instruction, a pipeline delay signal p1 to the multiplier is set to 10 so as to insert a mpy instruction to a register of a succeeding stage to control an arithmetic logic unit. Also, an ars instruction is issued towards a bit operator to execute an arithmetic right shift operation for arranging the digit figures in accumulating the multiplied results. Pipeline delay signal p2 is set to 100 to insert an ars instruction to a register of a succeeding stage to control the multiplier. Then, an add instruction is issued to an accumulator to accumulate the shifted results. Pipeline delay signal p3 is set to 1000 to insert an add instruction in a register of a succeeding stage to control the bit operator.

Issuance of an instruction and generation of a pipeline delay signal are carried out at the same time. An instruction is inserted into a predetermined stage. As a result, a control signal is applied so as to carry out a sub instruction with respect to an arithmetic logic unit at the next stage where an instruction is inserted. Also, an instruction included in the second stage and et seq. of the operation of a composite instruction prior to the above subsra instruction or a control signal indicating no operation (nop) is applied to other operation units. The shift register shifts the applied control signal by one stage. Here, insertion of a control signal into the shift register with respect to an applied instruction is carried out similar to the above subsra instruction.

At the next stage, a control signal for carrying out a mpy instruction with respect to the multiplier is output. A control signal corresponding to an instruction included in the third stage and et seq. of an operation of a composite instruction prior to the above subsra instruction, a control signal corresponding to the instruction of the first stage of the instruction applied subsequent to the above subsra instruction, or a control signal corresponding to nop is provided to other operation units. The shift register shifts the control signal by one stage. At the same time, insertion of a control signal to the shift register with respect to the instruction applied at the current stage is carried out similar to the above subsra instruction.

By repeating the above process sequentially, a subsra instruction is carried out over four stages from a sub instruction with respect to the arithmetic logic unit. Furthermore, a decoding operation of continuously applied instructions subsequent to a subsra instruction and a determination operation of the number of pipe stages are carried out to sequentially execute the instructions without waiting for completion of the subsra instruction.

In the SIMD processor of the sixth embodiment, a structure is provided in which each processing element decodes an operation code from the overall control unit using pipeline register for an instruction and also makes determination of the position of inserting the decoded result into a pipeline register. A control signal with respect to the operation processing unit of an SIMD processor having a variable pipeline structure is generated internal of each processing element. Therefore, the control signal output from the overall control unit to an operation unit is exclusively an operation code. The number of control buses can be reduced.

Seventh Embodiment

Figure 13:
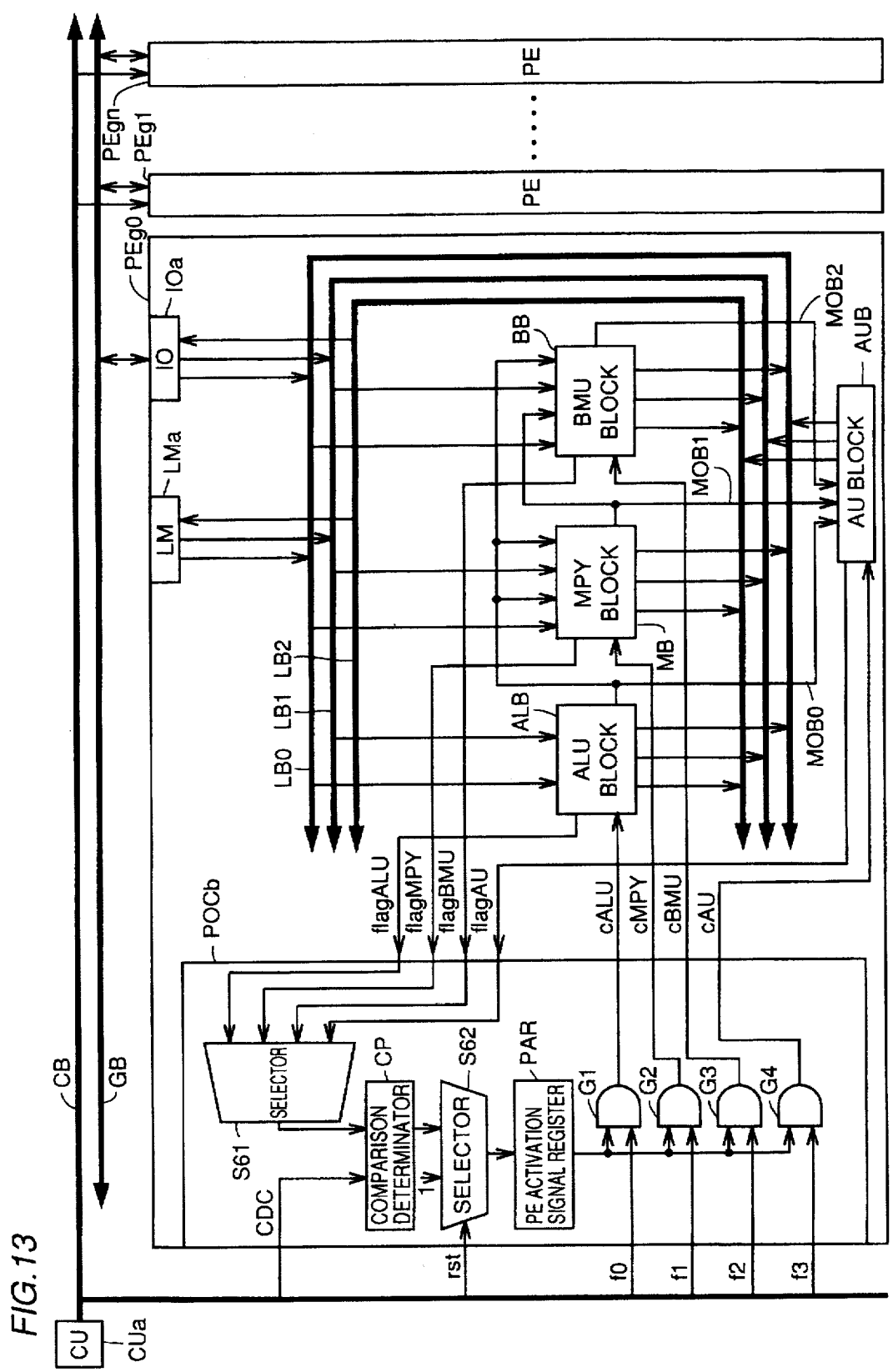
FIGS. 13 and 14 are block diagrams showing a structure of an SIMD processor according to seventh and eighth embodiments, respectively, of the present invention.

Referring to FIG. 13, an SIMD processor includes an overall control unit CUa, a control bus CB, a global bus GB, and a plurality of processing elements PEg0–PEgn.

Each of processing elements PEg0–PEgn includes a local memory LMa, a data input/output unit IOa, an ALU block ALB, an MPY block MB, a BMU block BB, an AU block AUB, and a PE operation control unit POCb.

PE operation control unit POCb includes selectors S61 and S61, a comparison determination unit CP, a PE activation signal register PAR, and AND circuits G1–G3.

The SIMD processor of FIG. 13 is similar to that shown in FIG. 1 except that a PE operation control unit POCb is additionally provided. Corresponding components have the same reference characters denoted, and their description will not be repeated. ALU block ALB, MPY block MB, BMU block BB, and AU block AUB generate and provide to PE operation control unit POCb flags flagALU, flagMPY, flagBMU, and flagAU, respectively, when the operation result indicates an overflow, a negative value, or 0 in response to the operation result.

PE operation control unit POCb receives control signals f0–f3 from overall control unit CUa via control bus CB which are provided to each operation unit and condition determination code CDC. Condition determination code CDC specifies an operation unit that provides a flag. Condition determination code CDC is applied to comparison determination unit CP where determination is made whether a flag applied via selector S61 is a desired flag or not. Comparison determination unit CP outputs 1 and 0 when the flag of a selected operation unit and condition determination code CDC from overall control unit CUa match or not match, respectively. The output result is provided to PE activation signal register PAR via selector S62. PE activation signal register PAR maintains the value until selector S62 is reset to 1 by a reset signal rst from overall control unit CUb.

The data stored in PE activation signal register PAR is ANDed with control signals f0–f3 with respect to each operation unit applied from overall control unit CUa to PE operation control unit POCb by AND circuits G1–G4. The results become control signals cALU, cMPY, cBMU, cAU of each operation unit. Therefore, when condition determination code CDC is applied and the determination result is 1, control signals f0–f3 from overall control unit CUa are directly applied to respective operation units, whereby each operation unit carries out a predetermined operation according to the control signal. When the determination result is 0, the instruction provided from overall control unit CUa is masked, and a control signal corresponding to hop is provided to respective operation units. This means that an operation unit will not operate until the data stored in PE activation signal register PAR is reset to 1 by overall control unit CUa.

In the SIMD processor of the seventh embodiment, respective operation units generate flags flagALU, flagMPY, flagBMU, and flagAU corresponding to the operation result and provides the generated flag to PE operation control unit POCb. In PE operation control unit POCb, a flag of an operation unit is compared according to condition determination code CDC from overall control unit CUa to generate a mask signal with respect to the succeeding instructions. It is therefore possible to selectively render operative a plurality of processing elements operating in parallel under the same control signal according to the comparison result of respective operation units. Thus, a variety of processes can be executed in the SIMD processor of FIG. 7.

Eighth Embodiment

Figure 14:
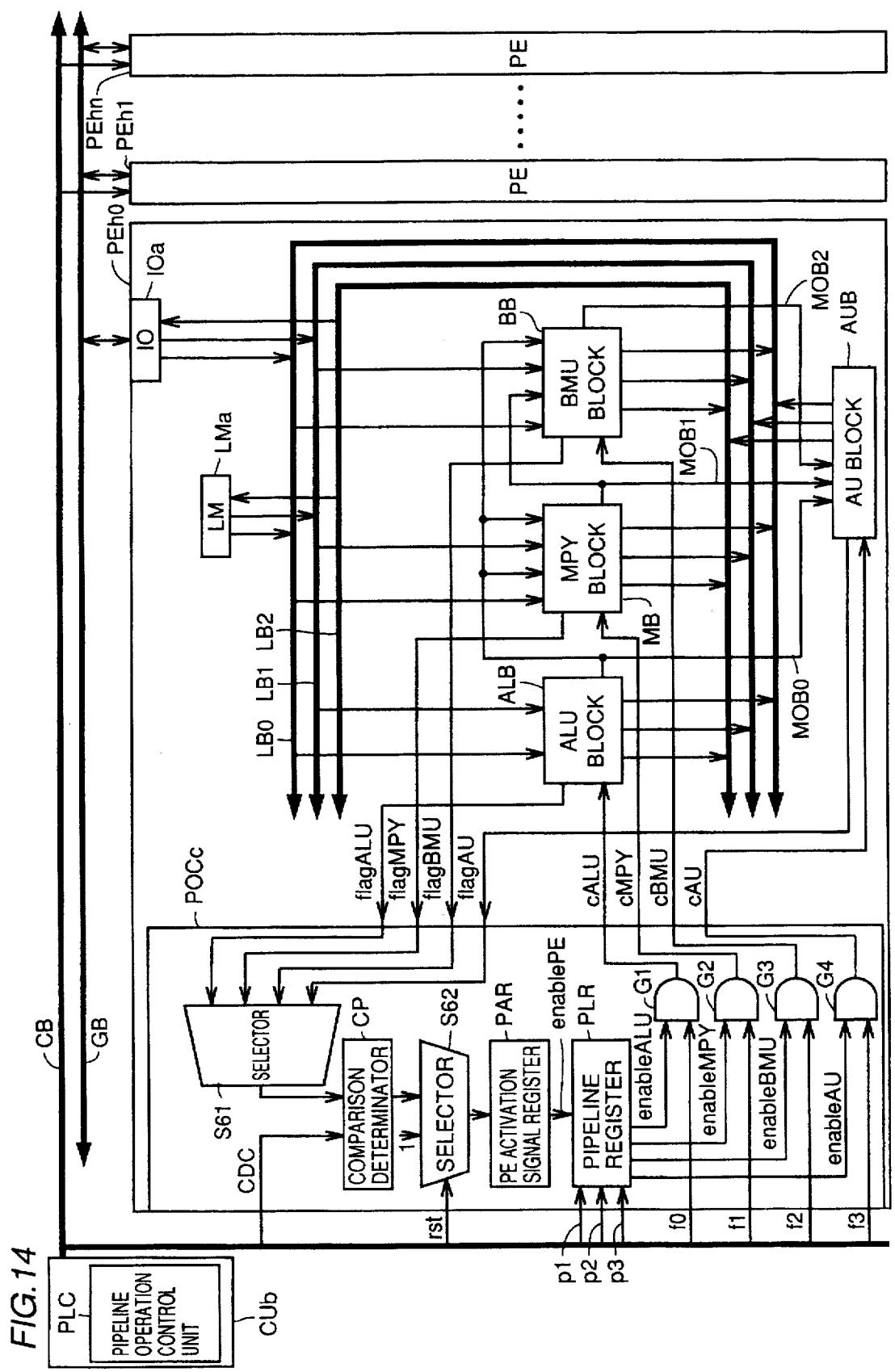

FIG. 14 is a block diagram showing a structure of an SIMD processor according to an eighth embodiment of the present invention. The SIMD processor of FIG. 14 differs from that of FIG. 13 in that a pipeline operation control unit PLC is provided for providing pipeline delay signals p1–p3 similar to those generated by a decode unit DU shown in FIG. 11 within overall control unit CUb. Furthermore, a pipeline register PLR is additionally provided in PE operation control unit OPCc. The remaining components are similar to those of the SIM of FIG. 13, and corresponding components have the same reference characters denoted.

Pipeline register PLR is inserted between PE activation signal register PAR and AND circuits G1–G4. PE operation control unit POCc delays data provided from PE activation signal register PAR according to pipeline delay signals p1–p3 through a pipeline by pipeline register PLR. AND circuits G1–G4 take the logical product of the pipeline-delayed data and respective control signals f0–f3 provided from overall control unit CUb. Control signals cALU, cMPY, cBMU, and cAU are provided to respective operation units. Pipeline operation control unit PLC includes instruction pipeline registers similar to those shown in FIG. 11. Each instruction is subject to a pipeline-delay corresponding to a composite instruction to be provided to all processing elements PEh0–PEhn.

The pipeline register of FIG. 14 will be described in detail with reference to FIG. 15.

Figure 15:
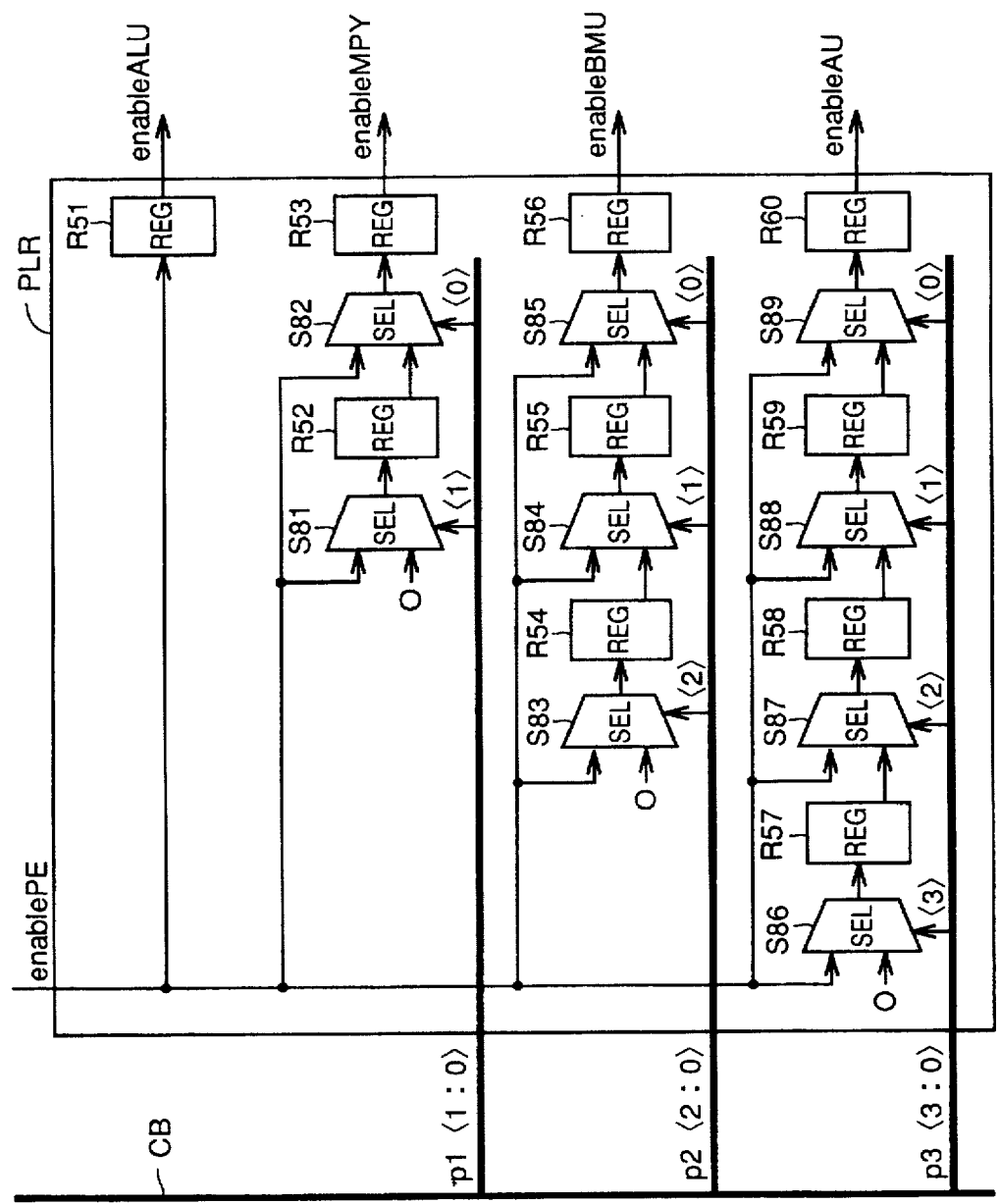
FIG. 15 is a block diagram showing a structure of a pipeline register of FIG. 14.

Referring to FIG. 15, pipeline register PLR includes registers R51–R60 and selectors S81–S89.

Although pipeline register PLR has a structure similar to the shift register portion of a control signal of the PE operation control unit of FIG. 11, it is to be noted that the bit width of registers R51–R60 is 1 bit, and the inserted signal is a PE activation signal enablePE output from PE activation signal register PAR storing the same condition determination result. The manner of inserting PE activation signal enablePE is identical to the manner of inserting a control signal in the PE operation control unit of FIG. 11.

The operation of the pipeline register of FIG. 15 will be described in detail with reference to FIG. 16.

Referring to FIG. 16 corresponding to a pipeline register of one arbitrary processing element, the operation up to time t3 includes decoding of a subsra instruction by overall control unit CUb, delay of a control signal towards respective operation units by an operation control signal pipeline register in pipeline operation control unit PLC, and application of the delayed signal to each of processing elements PEh0–PEhn. At time t4, an instruction for making determination of a flag of any of the operation units is applied, and 0 is stored in PE activation signal register PAR indicating that the determination result does not match condition determination code CDC from overall control unit CUb.

In pipeline register PLR, 1 is stored in all the registers for continuously operating each operation unit until a condition determination result is obtained. At a condition determination instruction execution mode, nop is inserted in pipeline registers PLR for all operation units.

It is assumed that a mac instruction (a sum of products) succeeds the condition determination code. Pipe delay signals are smaller than a subsra instruction respectively by 1 delay value, i.e. p1=01, p2=010, p3=0100. Therefore, in pipeline register PLR, the nop inserted at the final stage of the pipeline register which is the immediate preceding instruction, i.e. a condition determination code, will not be transmitted to the next stage, and a control signal corresponding to mpy, ars, and add instructions required for the mac instruction are inserted according to the pipeline delay value. Similarly, in pipeline register PLR, 1 inserted in the final stage of the pipeline register will not be transmitted to a succeeding stage, and 0 which is the condition determination result is inserted according to pipeline delay values p1–p3.

At the time of inserting PE control signal enablePE to a pipe with respect to the mac instruction of time t5, control signals enableBMU and enableAU with respect to the bit operator and the accumulator, respectively, remain 1 corresponding to a subsra instruction prior to execution of the condition determination. This control signal is subject to pipe-delay and then output. Although PE activation signal enablePE is already 0, the subsra instruction prior to execution of the condition determination is carried out until the final stage. 0 is inserted in pipeline register PLR after the mac instruction at time t5.

Although a processing element is described when the condition determination result is 0, there is also the possibility of a condition determination result of 1 in another processing element. In this case, 1 is inserted in the pipeline register PLR in that processing element, and all the succeeding instructions are executed.

As time t8, an instruction for setting PE activation signal register PAR to 1 is applied. PE activation signal register PAR is set to 1 in all processing elements, and 1 is inserted into pipeline register PLR to have the succeeding instructions executed by all the processing elements. In FIG. 16, the subsra instruction subsequent to time t9 is sequentially executed in a manner similar to that carried out from time t0 to t3, where insertion is carried out with pipeline register PLR and PE activation signal register PAR.

In the SIMD processor of the eighth embodiment, PE activation signal enablePE is inserted into pipeline register PLR for respective operation units according to pipeline delay signals p1–p3. Control signals cALU, cMPY, cBMU and cAU provided from PE operation control unit POCc are obtained as a result of. Control signals enableALU, enableMPY, enableBMU, enableAU which serve as an operation unit activation signal being ANDed with control signals f0–f3 prior to being provided to respective operation units with a pipe delay identical to that of control signals f0–f3 provided from overall control unit CUb. When a processing element is to be selectively activated upon condition determination, it is not necessary to wait for the completion of a preceding composite instruction to issue a condition determination instruction. It is also not necessary to insert a nop in the instruction train. Therefore, instruction description is facilitated and a condition determination instruction can be described at an arbitrary position. The number of instruction steps can be reduced to realize high speed processing. Furthermore, since a pipeline process is carried out with one overall control unit CUb, the circuit complexity of each of processing elements PEh0–PEhn can be reduced.

Ninth Embodiment

Figure 17:
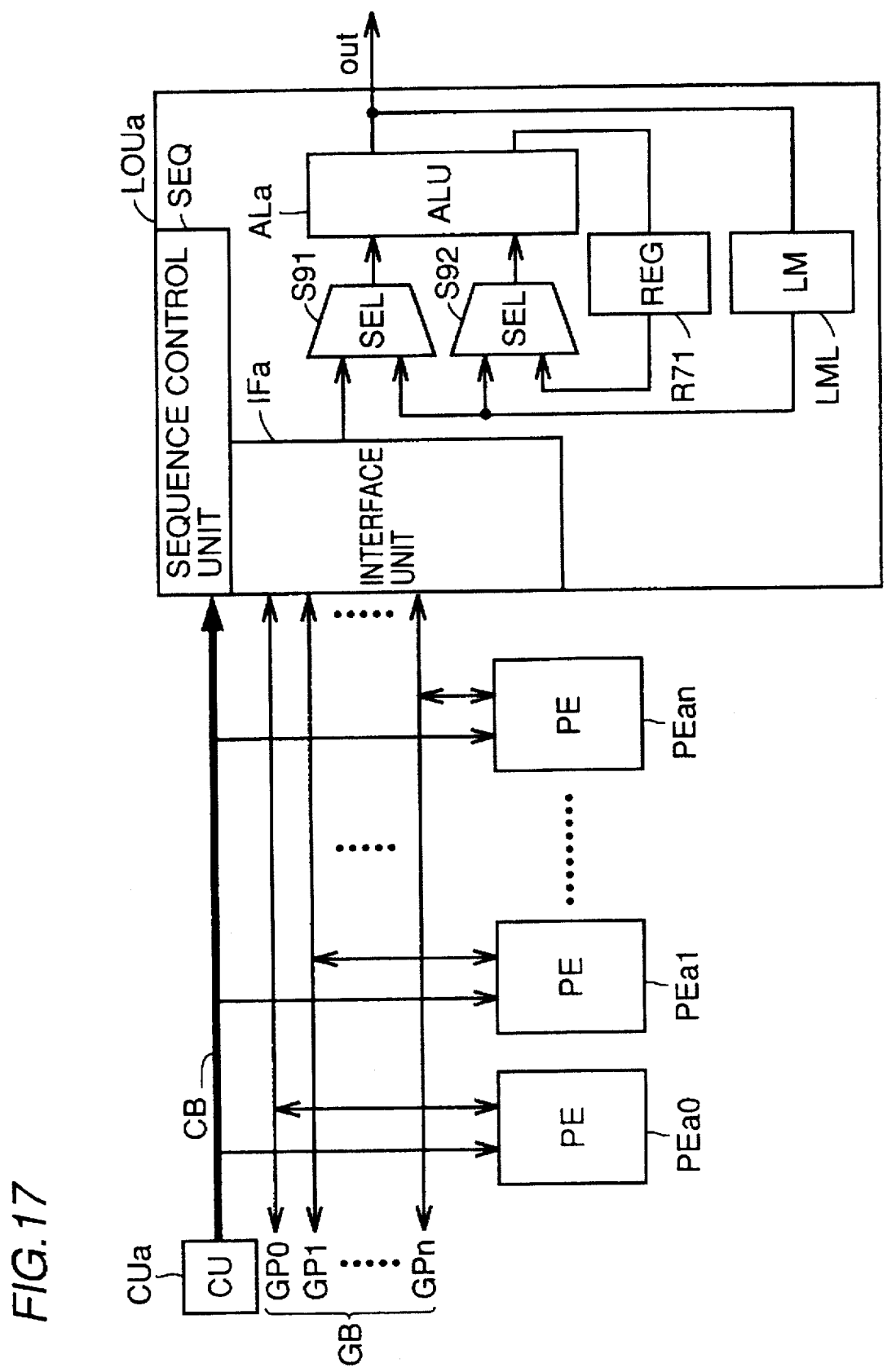
FIG. 17 is a block diagram showing a structure of an SIMD processor according to a ninth embodiment of the present invention.

Referring to FIG. 17, an SIMD processor includes an overall control unit CUa, a control bus CB, a global bus GB (GP0–GPn), processing elements PEa0–PEan, and a link processing unit LOUa. Link processing unit LOUa includes a sequence unit SEQ, an interface unit IFa, selectors S91 and S92, a register R71, an arithmetic logic unit AL1, and a local memory LML. The SIMD processor of FIG. 17 differs from that of FIG. 1 in that a link processing unit LOUa is additionally provided. The remaining components are similar to those of the SIMD processor of FIG. 1, and corresponding components have the same reference characters denoted.

Link processing unit LOUa is connected to all global buses GP0–GPn and control bus CB. Link processing unit LOUa includes a sequence unit SEQ for controlling the processing sequence in link processing unit LOUa according to a control signal from overall control unit CUa, an interface unit IFa with global bus GB, an arithmetic logic unit ALa for carrying out addition, maximum value minimum value operation, a register R71 and a local memory LML for storing an output of arithmetic logic unit ALa, and selectors S91 and S92.

When a control signal is applied to sequence unit SEQ from overall control unit CUa via control bus CB to take the total sum of data output from processing elements PEa0–PEan to global bus GB, sequence control unit SEQ generates a control signal with respect to each element in link processing unit to carry out the following operations.

First, interface unit IFa provides output data from all processing elements output at the same time in parallel to link processing unit LOUa via global buses GP0–GPn. Then, data of global buses GP0–GPn are sequentially applied to arithmetic logic unit ALa via selector S91, whereby arithmetic logic unit ALa accumulates sequentially input data using register R71.

When the maximum value/minimum value is to be extracted from the outputs of all the processing elements, all the outputs of the processing elements are provided to link processing unit LOUa similar to the above accumulation process. The data are sequentially applied to arithmetic logic unit ALa. The current maximum value/minimum value is stored in register R71. By comparing the stored maximum value/minimum value with the next input, the maximum value/minimum value output from all the processing elements can be extracted.

Using the maximum value minimum value detection function, the outputs of the processing elements can be sorted in the descending order/ascending order. FIG. 18 is a diagram for describing a sorting process of extracting the three greatest data of the outputs of all the processing elements.

The three greatest data are stored in local memory LML. The largest, the second largest, and the third largest value are stored in address=0, address=1 and address=2, respectively. Data other than the three highest level are discarded. The smallest possible value of the data to be sorted is stored in each address of local memory LML.

When all the outputs of processing elements are provided to link processing unit LOUa, a maximum value detection operation is carried out between the value on global bus GP0 and the value stored in address=0 of local memory LML. The greater value is written into address=0 of local memory LML, and the smaller value is stored in register R71. Next, a maximum value detection operation is carried out in a similar manner between the data in address=1 of local memory LML and the lower value of the prior maximum value detection operation stored in register R71. The greater value thereof is written into address=1 of local memory LML, and the smaller value is stored in register R71. Similarly, a maximum value detection operation is carried out between the data stored in address=2 of local memory LML and the data in register R71.

According to the above process, a maximum value detection operation and data exchange are carried out three times between the output of one processing element and the three highest value stored in local memory LML. By repeating the above process from global bus GP0 to GPn, the three greatest data out of the outputs of n+1 processing elements can be derived. By carrying a similar operation with respect to the output of the next processing element after the output of the current processing element, the three highest data output of 2 (n+1) data can be derived.

The outputs of the processing elements can be sorted in an ascending order by carrying out a minimum value detection operation instead of the above-described maximum detection operation.

In the SIMD processor of the ninth embodiment, a link processing unit LOUa connected to a global bus includes an arithmetic logic unit ALu and a local memory LML allowing addition and maximum value minimum value detection operations. Since accumulation and sorting of the outputs of the processing elements can be carried out without having to exchange data between the processing elements, the speed of processing due to parallel arrangement and the integration function of data of the parallel processing elements can further be improved.

Tenth Embodiment

Figure 19:
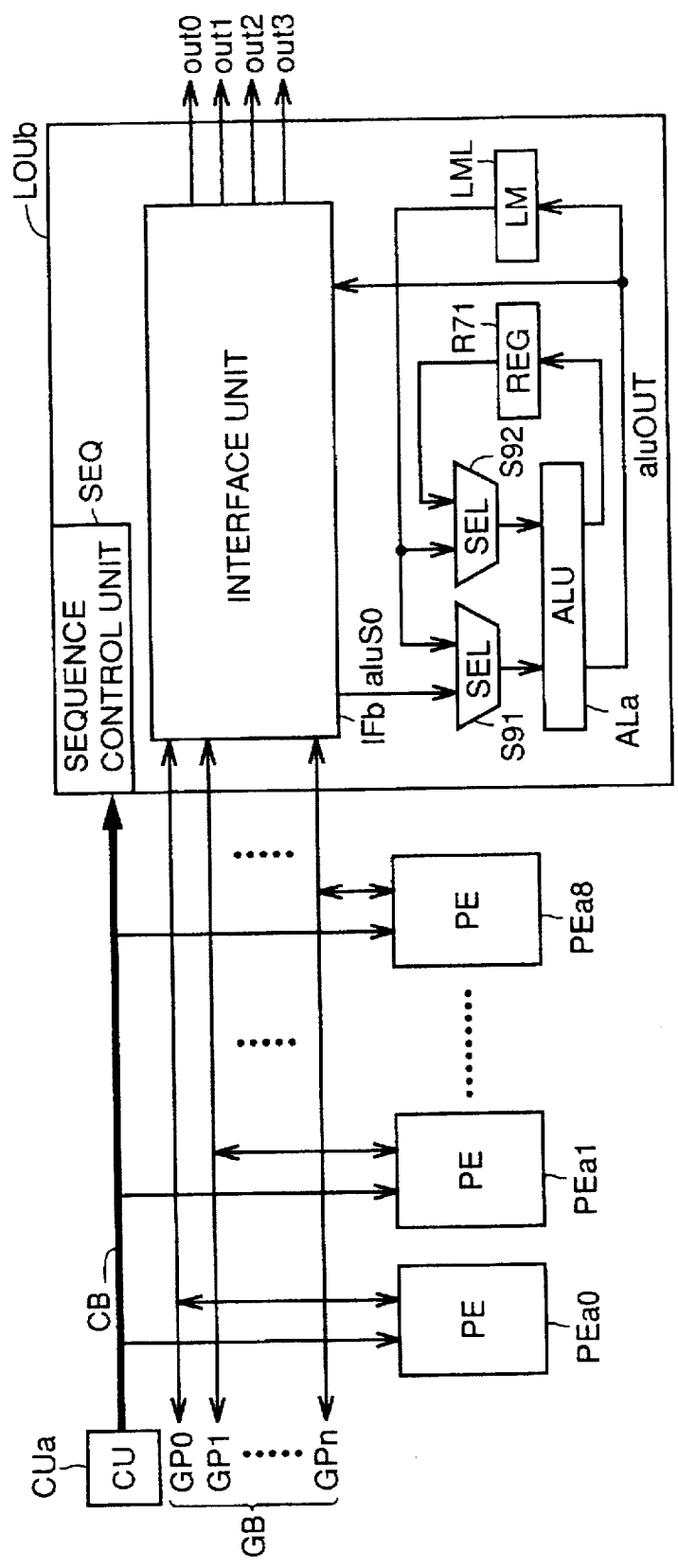
FIG. 19 is a block diagram showing a structure of an SIMD processor according to a tenth embodiment of the present invention.

FIG. 19 is a block diagram showing a structure of an SIMD processor according to a tenth embodiment of the present invention. The SIMD processor of FIG. 19 differs from the SIMD processor of FIG. 17 in that interface unit IFa is modified into a plurality of outputs of interface units IFb. The remaining components are similar, and have the same reference characters denoted.

Interface unit IFb includes four outputs out0–out3 which are provided from link processing unit LOUb. The data of each of outputs out0–out3 has a bit width of 16 bits.

Interface unit IFb will be described in detail with reference to FIG. 20.

Figure 20:
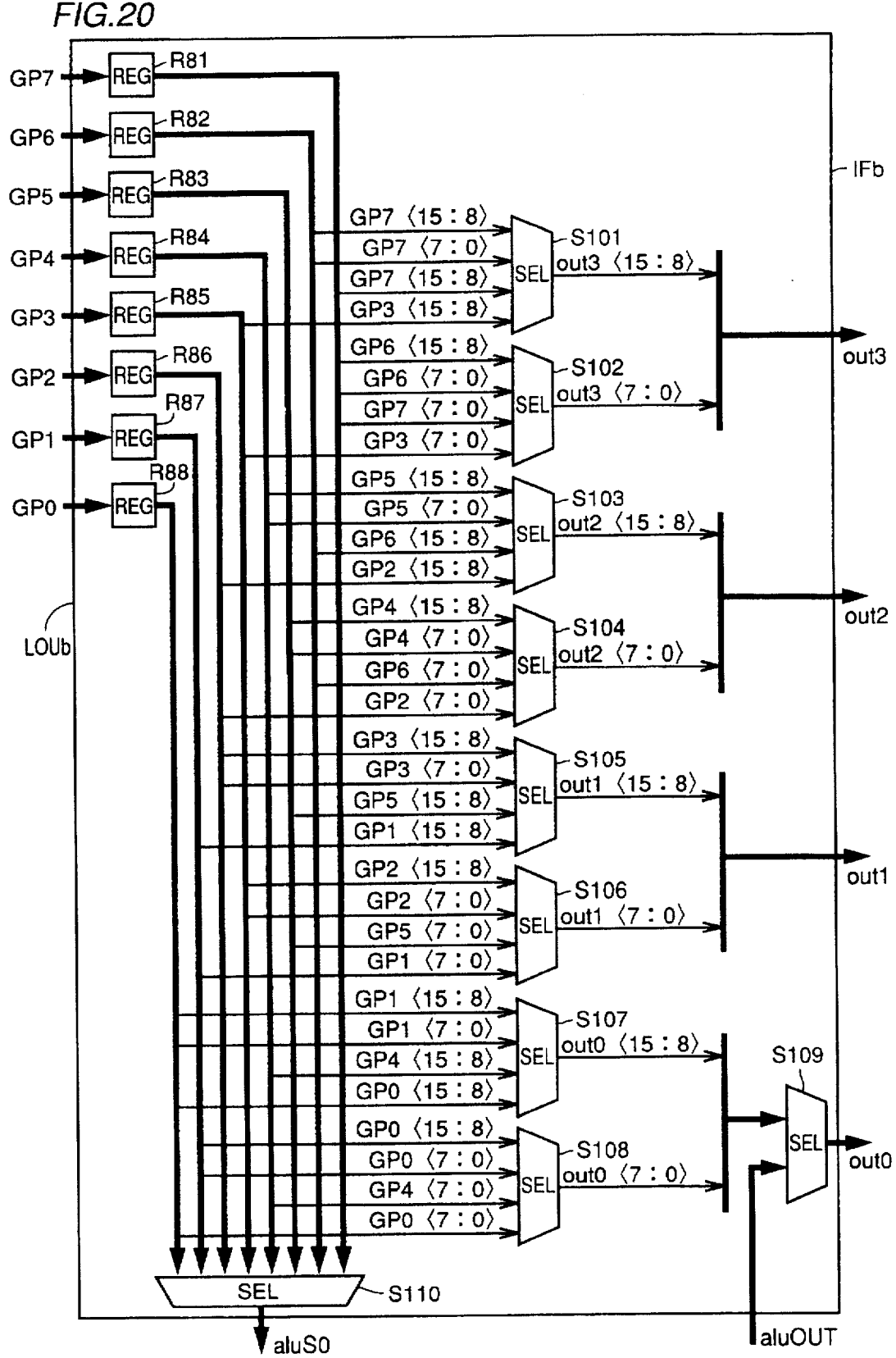
FIG. 20 is a block diagram showing a structure of the interface unit of FIG. 19.

Referring to FIG. 20, interface unit IFb includes registers R81–R88, and selectors S101–S110. Interface unit IFb receives the outputs of all the processing elements by eight 16-bit registers R81-R88 to carry out an operation on all output data of processing elements. The entered output is provided to arithmetic logic unit ALu via 8-input selector S110 and selector S91. An operation result aluOUT in link processing unit LOUb is provided as output out0 via 2-input selector 109.

When operation of data between processing elements is not required, the data is divided into upper and lower 8 bits to be provided via 4-input selectors S101-S108 connected to four output portions. The input route of data towards 4-input selectors S101-S108 is as shown in FIG. 20. For example, GP7 <15:8> implies the upper 8 bits of data on global bus GP7, and GP7 <7:0> implies the lower 8 bits of data on global bus GP7.

As a first output manner where data of processing elements PEa0-PEa3 are to be output, the last stage of the 4 input data is selected in all 4-input selectors S101-S108. Therefore, the outputs of processing elements PEa0, PEa1, PEa2, and PEa3 are provided as out0, out1, out2, and out3, respectively.

As a second output manner where data of processing elements PEa4-PEa7 are to be output, the bottom but second data of the 4 input data is selected in all 4-input selectors S101-S108. The outputs of processing elements PEa4, PEa5, PEa6, and PEa7 are provided as out0, out1, out2, and out3, respectively.

As third output manner where the lower 8 bits of the output data of all processing elements are to be output, the bottom but third data of the 4 input data is selected in all 4-input selectors S101-S108. The lower 8 bits of processing elements PEa0, PEa1, PEa2, and PEa3 are provided to the lower 8 bits of output out0, the upper 8 bits of output out 0, the lower 8 bits of output out1, and the upper high bits of output out1, respectively. The following processing elements PEa4-PEa7 are similarly operated to provide the outputs as out2 and out3.

As a fourth manner where the upper 8 bits of the output data of all the processing elements are output, the top stage data of the 4 input data is selected in all 4-input selectors S101-S108. The upper 8 bits of processing elements PEa0, PEa1, PEa2, and PEa3 are provided to the lower 8 bits of output out0, the upper 8 bits of output out0, the lower 8 bits of output out1, and the upper 8 bits of output out1, respectively. Similarly, the following processing elements PEa4-PEa7 are similarly operated to provide outputs as out2 and out3.

In the SIMD processor of the tenth embodiment where 8 parallel processing elements are provided, the outputs of the processing elements are provided via link processing unit LOUb, whereby the output of each processing element is divided into upper data and lower data to be selectively output according to the output of link processing unit LOUb as 4 outputs. Therefore, the outputs of the processing elements can be provided to the outside world in various output modes. Output is enabled with a reduced number of external output lines with respect to the 8 parallel outputs.

Eleventh Embodiment

Figure 21:
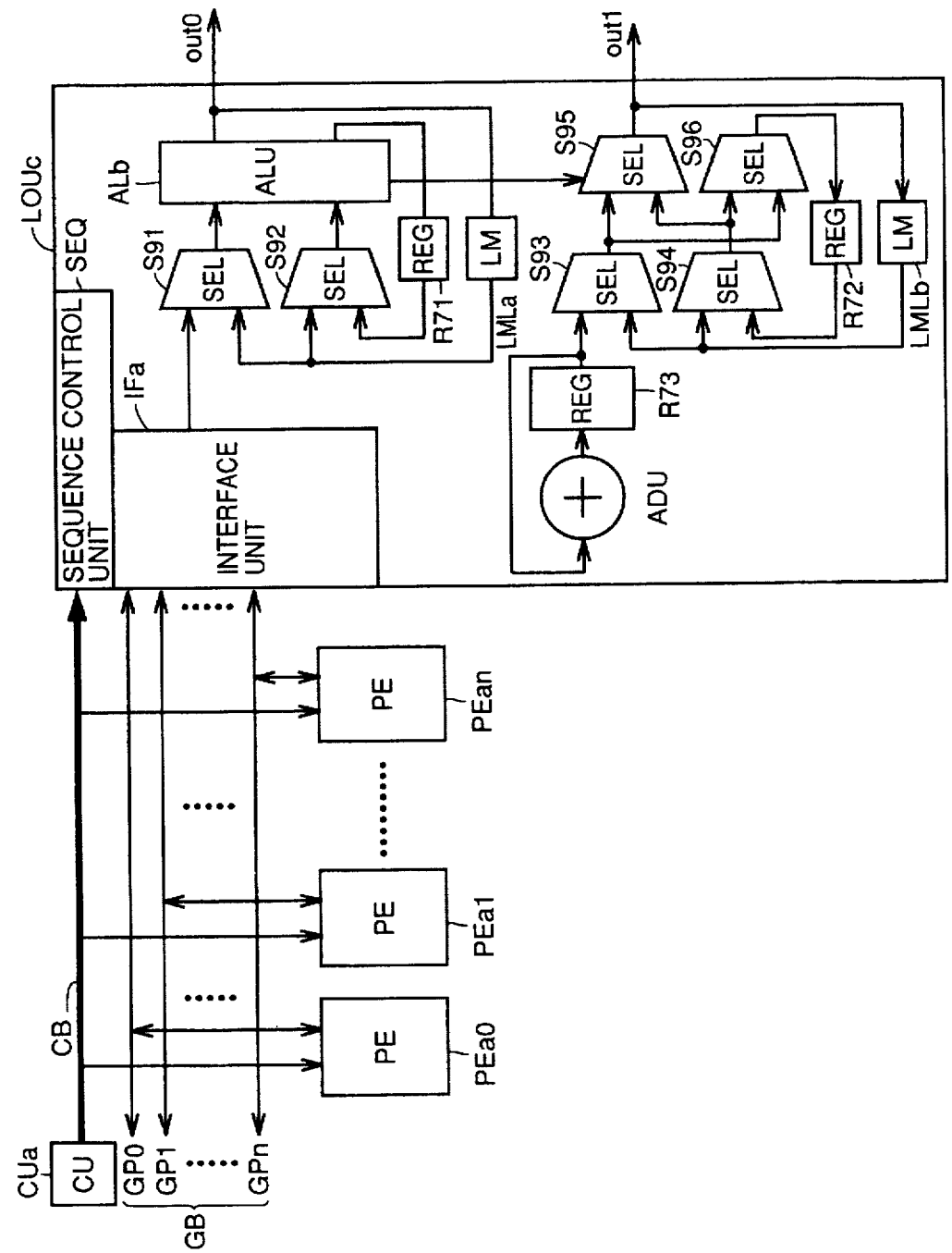
FIG. 21 is a block diagram showing a structure of an SIMD processor according to an eleventh embodiment of the present invention.
Figure 22:
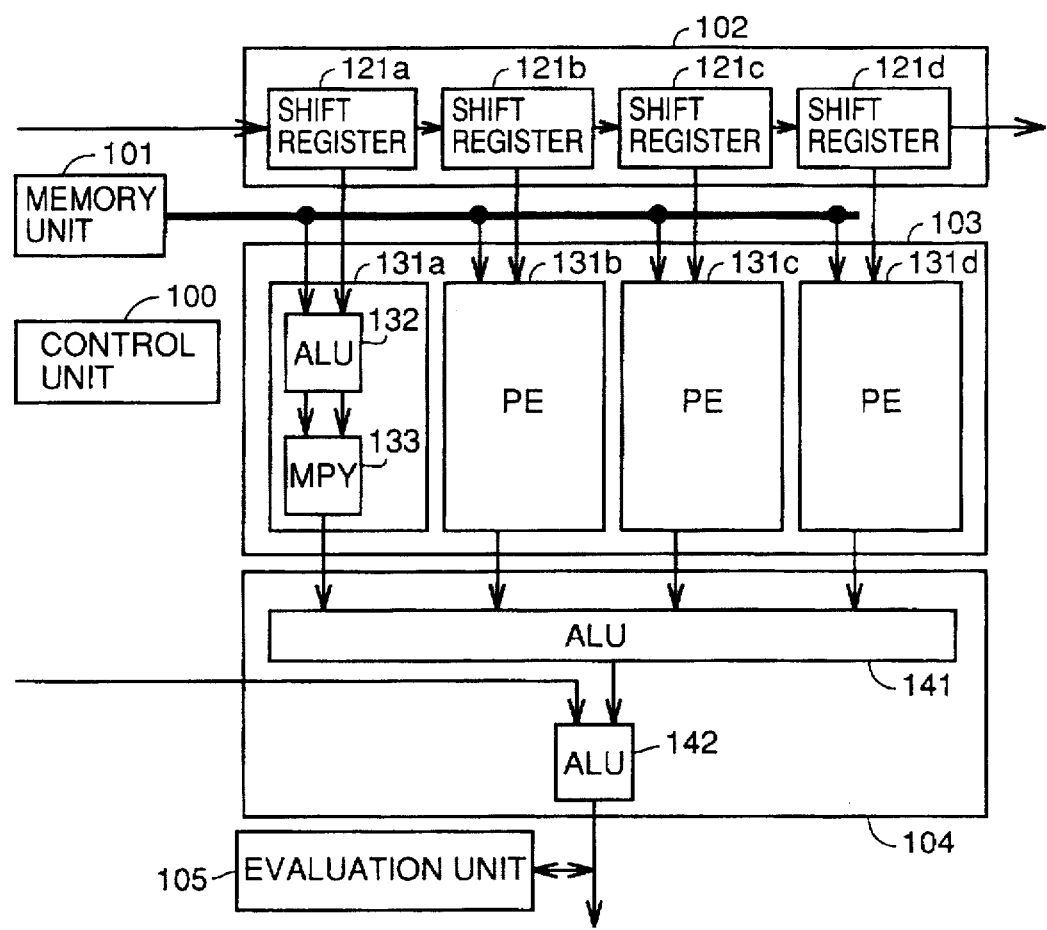
FIG. 22 is a block diagram showing a structure of a conventional SIMD processor.

Referring to FIG. 21, an SIMD processor of an eleventh embodiment includes selectors S93-S96, registers R72 and R73, a local memory LMLb, and an incrementer ADU, in addition to the components provided in the SIMD processor of FIG. 17. Corresponding components of the SIMD processors of FIGS. 17 and 21 have the same reference characters denoted, and their description will not be repeated.

Incrementer ADU increments its value by 1 every time data is applied from interface unit IFa to an arithmetic logic unit ALb for a sorting operation. The incremented value is provided to selector S93 of a succeeding stage for the purpose of data exchange with local memory LFLLb. According to the above operation, an inherent code can be allocated to an output of a processing element provided via interface unit IFa. Addressing of local memory LMLb and control with respect to the two 2-input selectors S93 and S94 of the first stage are similar to those of local memory LMLa and selectors S91 and S92 connected to arithmetic logic unit ALb.

The two 2-input selectors S95 and S96 of the second stage are controlled according to the operation result of arithmetic logic unit ALb to carry out data exchange similar to that of arithmetic logic unit ALb. Register R72 and local memory LMLb connected to 2-input selectors S95 and S96 store inherent data allocated to each data parallel to data exchange of outputs of processing elements. Therefore, it is easy to identify which output of a processing element the upper or lower terms of data extracted as a result of sorting of data applied to link processing unit LOUc from parallel processing element PEa0-PEan comes from. It is also possible to identify the processing element and the order of output the extracted data is by repeating data input to link processing unit LOUc.

In the SIMD processor of the eleventh embodiment, sorting outputs of processing elements in a link processing unit LOUc can be carried out by allocating a code with respect to an output of each processing element. Therefore, a processing element per se does not have to generate a code in contrast to a process such as a vector matching process where identification is required by allocating a code to the data. Accordingly, the circuit complexity of the processing element can be reduced. Furthermore, the process is further speeded since code allocation and sorting are executed parallel to operation in a processing element.

Arbitrary combinations of the above structures of the first to eleventh embodiments are allowed. In such a case, an effect similar to that described in each embodiment can be achieved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A SIMD processor comprising:
   overall control means;
   a plurality of processing elements;
   a global bus for connecting unidimensionally each of said plurality of processing elements in parallel; and
   a control bus for connecting said overall control means with each of said plurality of processing elements, wherein
   each of said plurality of processing elements comprises
      a local memory,
      plurality of operation means,
      data input/output means,
      a local bus connected to said local memory, said plurality of operation means, and said data input/output means for transferring data, and
      a composite operation bus connected to each of said plurality of operation means for transferring data to carry out a composite operation,
   said overall control means controls each operation of said plurality of processing elements so as to carry out the same operation, said local bus comprises
    two data input local buses for entering data of said plurality of operation means, and
    one data output local bus for providing data from said plurality of operation means,
said plurality of operation means comprises
    arithmetic logic operation means including an arithmetic logic unit,
    multiply means including a multiplier, bit operation means including a bit operator
    and
    accumulation means including an accumulator,
and
said composite operation bus comprises
    a first composite operation bus for providing an output data of said arithmetic logic unit to said multiplier, said bit operator, and said accumulator,
    a second composite operation bus for providing an output data of said multiplier to said bit operator and said accumulator, and
    a third composite operation bus for providing an output data of said bit operator to said accumulator.

2. The SIMD processor according to claim 1, wherein said arithmetic logic operation means further comprises
    first and second arithmetic logic registers for storing data provided from said two data input local buses,
    a third arithmetic logic register for storing data provided from said arithmetic logic unit, and
    arithmetic logic selector for selectively providing data output from said third arithmetic logic register to one of said two data input local buses and one data output local bus,
    wherein said arithmetic logic unit carries out an arithmetic logic operation process on data output from said first and second arithmetic logic registers,
    wherein said multiply means further comprises
    a first multiplication selector for receiving data output from one of said two data input local buses and data output from said first composite operation bus and providing one of the two received data,
    a second multiplication selector for selecting and providing one of data output from the other of said two data input local buses and data output from said first composite operation bus,
    a first multiplication register for storing data output from said first multiplication selector,
    a second multiplication register for storing data provided from said second multiplication selector,
    a third multiplication register for storing data provided from said multiplier, and
    a third multiplication selector for selectively providing data output from said third multiplication register to one of said two data input local buses and one data output local bus,
    wherein said multiplier multiplies data output from said first and second multiplication registers and provides the multiplied data to said third multiplication register,
    wherein said bit operation means further comprises
    a first bit operation selector for selectively providing one of data output from one of said two data input local buses and data output from said second composite operation bus,
    a second bit operation selector for selectively providing one of data provided from the other of said two data input local buses and data output from said first composite operation bus,
    a first bit operation register for storing data provided from said first bit operation selector,
    a second bit operation register for storing data provided from said second bit operation selector,
    a third bit operation register for storing data provided from said bit operator, and
    a third bit operation selector for providing data output from said third bit operation register selectively to one of said two data input local buses and one data output local bus,
    wherein said bit operator carries out a bit operation process on data output from said first and second bit operation registers,
    wherein said accumulation means further comprises
    a first accumulation selector for selectively providing one data out of data output from said first to third composite operation buses,
    a first accumulation register for storing data provided from said first accumulation register,
    a second accumulation register for storing data provided from said accumulator, and
    a second accumulation selector for providing data output from said second accumulator register selectively to one of said two data input local buses and one data output local bus,
    wherein said accumulator carries out an accumulation operation using data output from said first and second accumulation registers.

* * * * *